(12) United States Patent
Yoshizawa et al.

(10) Patent No.: US 8,148,864 B2
(45) Date of Patent: Apr. 3, 2012

(54) DYNAMOELECTRIC MACHINE

(75) Inventors: Toshiyuki Yoshizawa, Tokyo (JP);
Masaya Inoue, Tokyo (JP); Kanji Shinkawa, Tokyo (JP); Masao Morita, Tokyo (JP); Moriyuki Hazeyama, Tokyo (JP); Hiroyuki Akita, Tokyo (JP); Shinji Nishimura, Tokyo (JP); Norihiro Murata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 261 days.

(21) Appl. No.: 12/670,917

(22) PCT Filed: Mar. 26, 2008

(86) PCT No.: PCT/JP2008/055687
§ 371 (c)(1),
(2), (4) Date: Jan. 27, 2010

(87) PCT Pub. No.: WO2009/028228
PCT Pub. Date: Mar. 5, 2009

(65) Prior Publication Data
US 2010/0207476 A1 Aug. 19, 2010

(30) Foreign Application Priority Data

Aug. 28, 2007 (JP) ................................. 2007-221110

(51) Int. Cl.
*H02K 21/12* (2006.01)
(52) U.S. Cl. .................... 310/156.12; 310/263; 310/194
(58) Field of Classification Search ........... 310/156.12–156.14, 216.067, 310/263, 194, 43, 254.1
See application file for complete search history.

(56) References Cited

U.S. PATENT DOCUMENTS

| 5,543,676 | A | | 8/1996 | York et al. |
| 5,892,313 | A | * | 4/1999 | Harris et al. .................. 310/263 |
| 6,201,335 | B1 | * | 3/2001 | Higashino et al. ............ 310/263 |

(Continued)

FOREIGN PATENT DOCUMENTS

JP 8 308190 11/1996

(Continued)

OTHER PUBLICATIONS

U.S. Appl. No. 12/921,319, filed Sep. 7, 2010, Inoue, et al.

(Continued)

*Primary Examiner* — Thanh Lam
(74) *Attorney, Agent, or Firm* — Oblon, Spivak, McClelland, Maier & Neustadt, L.L.P.

(57) ABSTRACT

A dynamoelectric machine includes first and second magnet seat portions disposed to project from portions of first and second yoke portions that face respective inner circumferential surfaces near tip ends of second and first claw-shaped magnetic pole portions, and magnet housing portions disposed integrally to extend axially outward from outer circumferential portions of a pair of flange portions of a bobbin, extend near the first and second yoke portions that face the inner circumferential surfaces near the tip ends of the first and second claw-shaped magnetic pole portions, and be held by the first and second magnet seat portions. First and second permanent magnets are housed and held in the first and second magnet housing portions, are disposed to face the inner circumferential surfaces near the tip ends of the second and first claw-shaped magnetic pole portions, and the first and second permanent magnets are respectively magnetically oriented in a reverse direction to a direction of a magnetic field that the field coil produces.

10 Claims, 16 Drawing Sheets

U.S. PATENT DOCUMENTS

| | | | |
|---|---|---|---|
| 6,225,727 B1 | 5/2001 | Oohashi et al. | |
| 6,252,330 B1 | 6/2001 | Asao et al. | |
| 6,333,582 B1 * | 12/2001 | Asao et al. | 310/263 |
| 6,426,581 B1 * | 7/2002 | York et al. | 310/263 |
| 6,555,944 B1 | 4/2003 | York | |
| 6,747,384 B2 * | 6/2004 | Militello et al. | 310/156.08 |
| 6,989,622 B1 * | 1/2006 | Chen et al. | 310/263 |
| 7,560,851 B2 | 7/2009 | Inoue et al. | |
| 7,583,005 B2 * | 9/2009 | York | 310/263 |
| 7,605,519 B2 | 10/2009 | Morita et al. | |
| 7,656,069 B2 | 2/2010 | Shinkawa et al. | |
| 7,784,168 B2 * | 8/2010 | Ooiwa | 29/598 |
| 2001/0011856 A1 | 8/2001 | Asao et al. | |
| 2003/0137212 A1 | 7/2003 | Militello et al. | |

FOREIGN PATENT DOCUMENTS

| | | |
|---|---|---|
| JP | 11 150897 | 6/1999 |
| JP | 2000 341918 | 12/2000 |
| JP | 2002 199678 | 7/2002 |
| JP | 2003 244875 | 8/2003 |

OTHER PUBLICATIONS

U.S. Appl. No. 12/920,954, filed Sep. 3, 2010, Hazeyama, et al.
U.S. Appl. No. 12/444,975, filed Apr. 9, 2009, Inoue, et al.
U.S. Appl. No. 12/376,969, filed Feb. 10, 2009, Inoue, et al.
U.S. Appl. No. 13/122,611, filed Apr. 5, 2011, Yoshizawa, et al.
U.S. Appl. No. 12/812,844, filed Jul. 14, 2010, Yoshizawa, et al.

* cited by examiner

| Alternator Rotational frequency(rpm) | Conventional device generated power (A) | Present invention generated power (A) |
|---|---|---|
| 1300 | 34 | 60 |
| 2000 | 113 | 130 |
| 5000 | 160 | 165 |

DYNAMOELECTRIC MACHINE

TECHNICAL FIELD

The present invention relates to a dynamoelectric machine such as an automotive alternator, etc., and relates particularly to a Lundell rotor construction in which permanent magnets are mounted.

BACKGROUND ART

Automotive alternators that use Lundell rotors have been used in automobiles for decades. Loads from electrical equipment that is mounted due to environmental issues have been increasing rapidly in recent years, and further increases in generated power are being sought from Lundell rotors. If attempts are made to answer these demands within the scope of conventional design, the alternators are invariably increased in size. Increases in alternator size are undesirable since the weight of and space occupied by such alternators is increased. Increases in alternator size are also known to give rise to new problems such as increased rotor inertia, and engine speed fluctuations and alternator inertial torque interacting and leading to belt vibration and slippage. Because of these facts, there is demand to increase alternator capacity without increasing alternator main body size.

Conventionally, means of disposing permanent magnets between claw-shaped magnetic pole portions that face each other in a Lundell rotor have been adopted in order to solve such problems (see Patent Literature 1 and 2, for example).

In addition, examples of magnet mounting methods include methods in which U-shaped magnets are held on claw-shaped magnetic pole portions by being fitted onto claw tips of the claw-shaped magnetic pole portions (see Patent Literature 3, for example).

Thus, various methods for holding permanent magnets have been proposed in conventional automotive alternators, but for these permanent magnet holding methods to be of practical use, it is necessary to: (1) increase permanent magnet holding reliability; (2) simplify assembly; (3) avoid thermal demagnetization of the permanent magnets; and (4) suppress induced voltages during no-load de-energization.

Each of these factors will now be explained.

(1) Permanent Magnet Holding Strength

In automotive alternators, rotors rotate at high speeds in a vicinity of up to 18,000 to 20,000 rpm when driven by torque that is transmitted from an engine by means of belts and pulleys. Because of this, even if small magnets that weight only a few grams per pole are installed, extremely large centrifugal forces that exceed several tens of kilogram force act on the magnets.

In answer to this, conventional magnet holding methods have attempted to hold the centrifugal forces that act on the magnets using the claw-shaped magnetic pole portions themselves. In conventional magnet holding methods, it is necessary to finish abutted surfaces of both the magnets and the claw-shaped magnetic pole portions with extremely high precision so as to place the two in a state of surface contact. In other words, if the two are placed in point contact, local stresses may be concentrated on the magnets, and the magnets may be damaged. Because raising magnet processing precision is difficult in mass-produced products, it is also possible to consider means for ensuring external shape precision of the magnets using SUS plates, etc., instead, but these lead to enormous costs.

To facilitate installation of field coils, pole cores are divided axially into two interfitting sections, and it is also necessary to increase interfitting precision. Realistically, ensuring such parts precision increases costs significantly during mass production of rotors. In addition, even if static shape precision is adapted in this manner, magnet holding in automotive alternators is still difficult. Specifically, since automotive alternators are disposed in engine compartments, they may be placed in high-temperature environments that are several tens of degrees above one hundred degrees Celsius, generating displacements of several tens of μm due to thermal expansion or contraction.

Large centrifugal forces also act on the claw-shaped magnetic pole portions even when not holding magnets, and the claw tip portions expand approximately 50 to 100 μm radially outward. Thus, the claw-shaped magnetic pole portions are displaced so as to flap with increases and decreases in engine rotational speed. Since the claw-shaped magnetic pole portions have a cantilever beam construction, displacement is greater at tip end portions, smaller at claw root end portions, and distances between adjacent claw-shaped magnetic pole portions also change.

Consequently, if attempts are made to hold the magnets using uniform surfaces despite the presence of such dynamic thermal and centrifugal displacements of the claw-shaped magnetic pole portions, a great deal of adaptation is required in the magnet holding construction. Because magnet main bodies or covers that protect the magnets slide and abrade due to displacement of the claw-shaped magnetic pole portions, it is necessary to ensure reliability of strength for a long time.

Because of these facts, the current situation is such that much further adaptation is required in order to resist the centrifugal forces that act on the magnets and hold the magnets on the claw-shaped magnetic pole portions, and it is desirable that the magnets be held somewhere other than by the claw-shaped magnetic pole portions. Thus, in order to avoid the effects on magnet holding of relative displacement between the magnets and the claw-shaped magnetic pole portions, a conventional improved magnet holding construction has been proposed in which magnets are disposed on an outer circumferential side of a yoke portion on axial end portions of a Lundell pole core (see Patent Literature 4, for example).

(2) Ease of Assembly

Assembly in a means in which permanent magnets are disposed between claw-shaped magnetic pole portions such as in Patent Literature 1 and 2, etc., requires permanent magnets to be mounted one at a time when the pole core is divided axially. However, axial positions of the permanent magnets between the claw-shaped magnetic pole portions are easily misaligned when the pole core bodies are put together, giving rise to imbalances in magnet positions between the magnetic poles. Thus, there have been problems such as steps for balancing the rotor itself being increased, and electromagnetic noise occurring due to imbalances in magnetic flux during rotation.

In a means in which permanent magnets are disposed near claw tips of the claw-shaped magnetic pole portions such as in Patent Literature 3 and 4, etc., magnets must be mounted one at a time, increasing mounting man-hours by an amount proportionate to the number of magnets.

(3) Demagnetization of Permanent Magnets

Having frequency components that are a product of the number of stator slots times rotational frequency per second, stator slot harmonic magnetic flux is a high-frequency magnetic field of two to three kilohertz. Under such conditions, if the magnets are held between the claw-shaped magnetic pole portions, or if U-shaped magnets are fitted onto and held by the tip ends of the claw-shaped magnetic pole portions, portions of the magnets or magnet holding metal fittings are exposed at the rotor surface facing the stator. These exposed magnets or magnet holding metal fittings are heated by induction by the high-frequency magnetic field due to slot harmonics. One problem is that if even a portion of a magnet is heated by induction and reaches a high temperature locally, heat will transfer to the entire magnet, and the magnet will be thermally demagnetized.

Portions of the magnets or magnet holding metal fittings are also exposed at the rotor surface facing the stator in the conventional improved magnet holding construction, making thermal demagnetization of the magnets similarly problematic.

In alternators to which a Lundell rotor is mounted, heat is generated in the field coil, and one problem has been that that heat is transferred to the permanent magnets through the rotor, exacerbating temperature increases in the magnets, and causing thermal demagnetization.

(4) Induced Voltages During No-load De-Energization

The above-mentioned conventional improved magnet holding construction has problems of induced voltage during no-load de-energization. In the conventional improved magnet holding construction, because the magnets are disposed in a vicinity of a surface of the rotor, main magnetic flux or leakage flux from the magnets may have components that cannot be kept inside the rotor and that interlink directly with the stator.

The design is such that magnetic flux leakage levels generate magnetic flux approximately equivalent to one or two volts in an engine idling region at approximately 500 rpm. However, since automotive engines have a variable speed range of approximately 1:10, if, for example, the maximum engine speed is ten times that of idling, the one- or two-volt induced voltages from the magnets may exceed the system voltage of the vehicle and have adverse effects on other onboard equipment. To suppress this, a "reverse field" is required in which the field power source is polarized, and the field current flow is made to flow in reverse at high speeds to weaken the magnetic flux. One problem is that when the direction of flow of the current becomes bidirectional instead of unidirectional, a bidirectional circuit that incorporates an H-bridge is required instead of simple chopper control, increasing the number of components, and raising product costs. Furthermore, unlike a normal field, it is necessary to start this reverse field swiftly in response to increases in engine speed, but since a coil that has a high impedance of several hundred turns is used so as to be able to control the field using a small current of approximately several amperes, it is currently difficult to make the reverse field current flow instantaneously. If the number of field turns is reduced in order to avoid this, new problems arise such as the electric current value of the control power source itself also being increased, increasing control element capacity, and raising product costs.

Patent Literature 1: Japanese Patent Laid-Open No. SHO 61-85045 (Gazette)
Patent Literature 2: U.S. Pat. No. 4,959,577 (Specification)
Patent Literature 3: U.S. Pat. No. 5,543,676 (Specification)
Patent Literature 4: Japanese Patent Laid-Open No. 2004-153994 (Gazette)

DISCLOSURE OF THE INVENTION

Problem to be Solved by the Invention

Thus, in order to hold permanent magnets on a Lundell pole core, it is necessary to increase permanent magnet holding reliability, to reduce assembly man-hours, to avoid thermal demagnetization of the permanent magnets, and to suppress induced voltages during no-load de-energization.

However, since the conventional magnet holding constructions described above do not achieve sufficient countermeasures against these four problems, they do not make any practical contribution.

The present invention aims to solve the above problems and an object of the present invention is to provide a dynamo-electric machine that has the characteristics described below:

(1) Holding construction is strengthened such that neither displacement of tip ends of claw-shaped magnetic pole portions, which changes greatly relative to centrifugal forces in particular, nor relative displacement between the claw-shaped magnetic pole portions, affect magnet holding directly;

(2) Magnet holding is simplified, enabling assembly man-hours to be reduced;

(3) In automotive alternators, which have wide temperature ranges, axial displacement among the claws relative to thermal expansion of the shaft and the rotor does not affect magnet holding directly;

(4) Permanent magnets are less likely to be heated by induction due to encroaching stator slot harmonic magnetic flux;

(5) Heat that is generated in a rotor field coil is insulated, making the permanent magnets less likely to be heated;

(6) Induced voltages during no-load de-energization are less likely to occur even if magnet volume is increased considerably; and (7) Increases in moment of inertia due to the addition of magnets and magnet holding materials are small, making inertia torque less likely to arise.

Means for Solving the Problem

In order to achieve the above object, according to one aspect of the present invention, there is a provided dynamo-electric machine including: a rotor including: a pole core including: a boss portion; a pair of yoke portions that are disposed so as to extend radially outward from two axial end edge portions of the boss portion; and a plurality of claw-shaped magnetic pole portions that are disposed so as to extend in an axial direction alternately from each of the pair of yoke portions, and that are arranged circumferentially so as to intermesh with each other, the pole core being fixed to a shaft that is inserted through a central axial position of the boss portion; a resin bobbin including: a drum portion that is mounted so as to be fitted over the boss portion; and a pair of flange portions that extend radially outward from two axial end portions of the drum portion along inner wall surfaces of the pair of yoke portions; and a field coil that is wound onto the bobbin, and that is housed inside a space that is surrounded by the boss portion, the pair of yoke portions, and the plurality of claw-shaped magnetic pole portions; and a stator that is disposed so as to surround the rotor with a predetermined air gap interposed. A magnet housing portion is disposed integrally on an outer circumferential portion of at least one flange portion of the pair of flange portions of the bobbin so as to extend axially outward and so as to extend near a portion of the yoke portions that faces an inner circumferential surface near a tip end of the claw-shaped magnetic pole portions, and a permanent magnet is housed and held in the magnet housing portion, is disposed so as to face the inner circumferential surface near the tip end of the claw-shaped magnetic pole portions, and is magnetically oriented in a reverse direction to a direction of a magnetic field that the field coil produces. A magnet seat portion is disposed so as to project from the portion of the yoke portion that faces the inner circumferential surface near the tip end of the claw-shaped magnetic pole portions, an interfitting recess portion is disposed on a portion of the magnet seat portion that faces the claw-shaped magnetic pole portions so as to extend axially, the magnet housing portion in which the permanent magnet is housed and held is held by the magnet seat portion by being fitted into and held by the interfitting recess portion, and the permanent magnet is insert-molded into the magnet housing portion such that at least a surface that faces the magnet seat portion and two axial end surfaces are embedded.

Effects of the Invention

According to the present invention, permanent magnets are disposed so as to be housed and held in magnet housing portions of a bobbin so as to face inner circumferential surfaces near tip ends of claw-shaped magnetic pole portions. Thus, because displacement of the claw-shaped magnetic pole portions that results from centrifugal forces or thermal expansion will not affect the permanent magnets, the magnet holding construction is strengthened, occurrences of cracking or chipping of the permanent magnets that result from the displacement of the claw-shaped magnetic pole portions are suppressed, and holding of the permanent magnets is also facilitated. The permanent magnets are held by the bobbin, and can be mounted to the pole core together with a field coil during assembly, reducing assembly man-hours, and improving assembly. Because the permanent magnets are positioned radially inside the claw-shaped magnetic pole portions, increases in moment of inertia that accompany disposition of the permanent magnets are reduced. In addition, centrifugal forces that act on the permanent magnets are also reduced, facilitating holding of the permanent magnets.

Because the permanent magnets are disposed so as to face inner circumferential surfaces near tip ends of the claw-shaped magnetic pole portions, the permanent magnets are positioned radially inside the claw-shaped magnetic pole portions and are not heated by induction directly due to stator slot harmonics, enabling thermal demagnetization to be prevented. Because the permanent magnets are thermally insulated from the field coil and the pole core by the bobbin, they are less likely to be affected by transfer of heat that is generated in the field coil, enabling thermal demagnetization to be prevented since magnet temperature will not increase.

In addition, because the permanent magnets are magnetically oriented in a reverse direction to the orientation of the magnetic field produced by the field coil, the magnetic field circuits formed by the permanent magnets are closed inside the rotor, suppressing the occurrence of induced voltages during no-load de-energization even if magnet volume is increased.

BEST MODE FOR CARRYING OUT THE INVENTION

Embodiment 1

Figure 1:
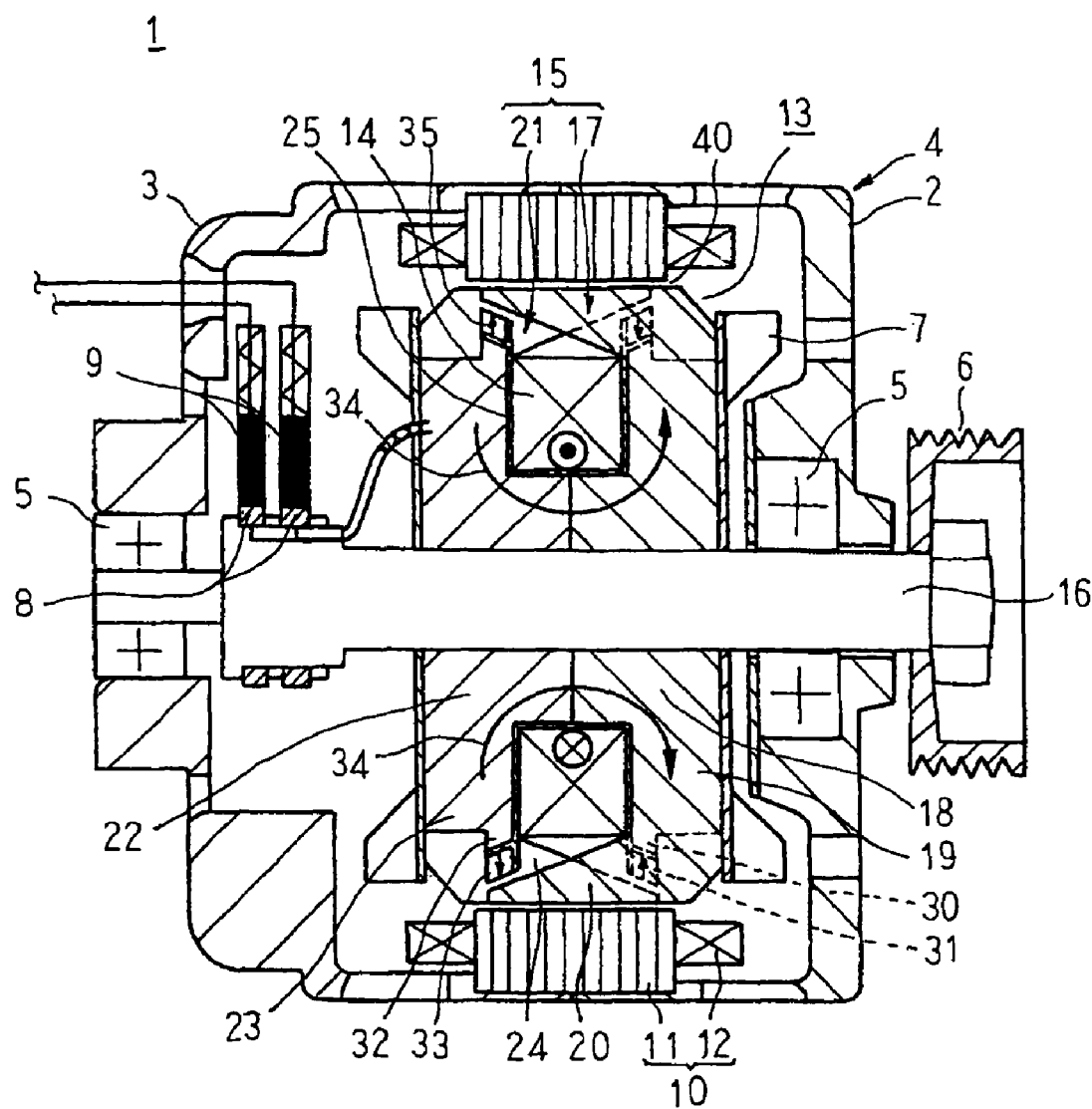
FIG. 1 is a cross section that schematically shows an automotive alternator according to Embodiment 1 of the present invention.
Figure 2:
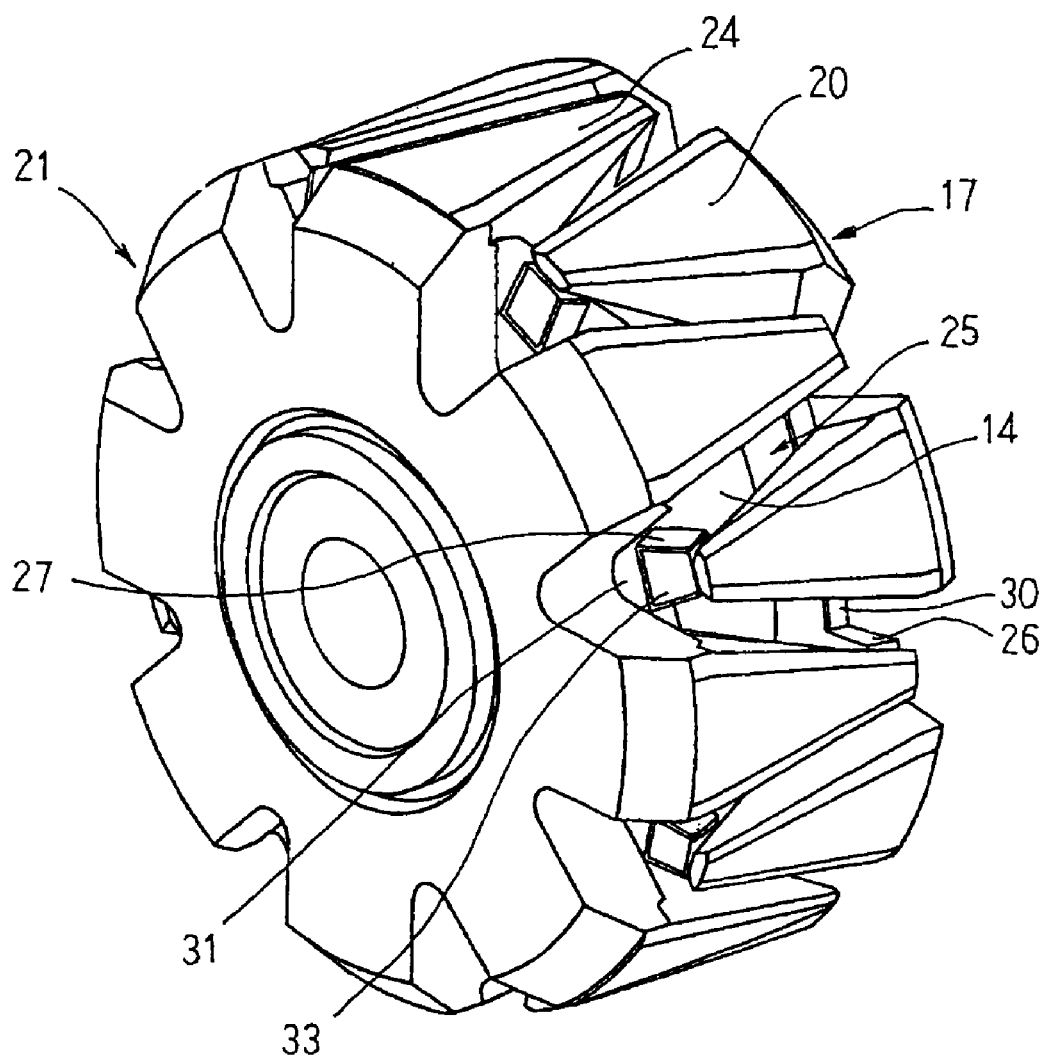
FIG. 2 is a perspective that shows a rotor that can be used in the automotive alternator according to Embodiment 1 of the present invention.
Figure 3:
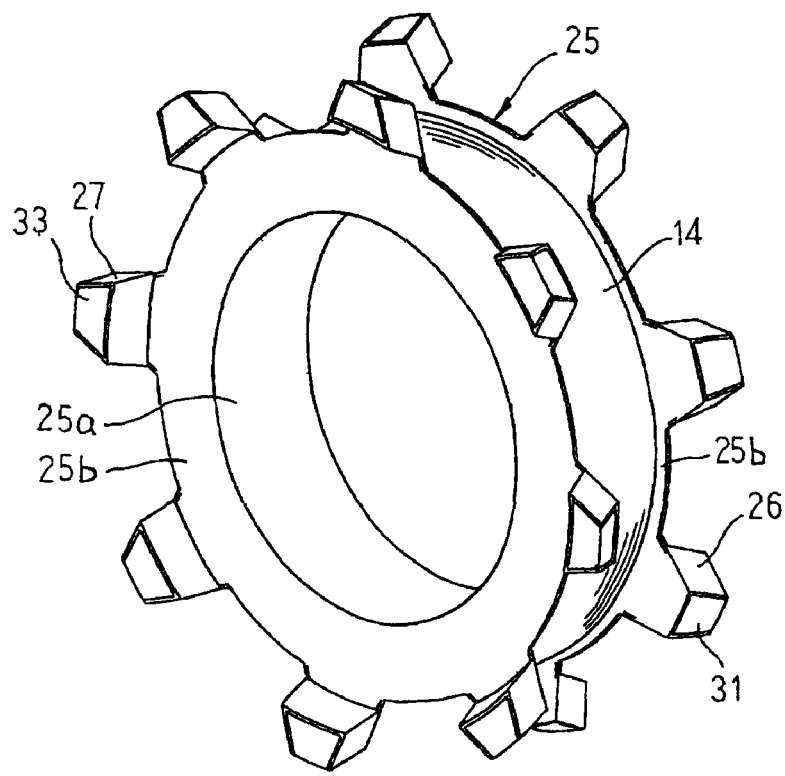
FIG. 3 is a perspective that shows a bobbin into which permanent magnets have been incorporated in the automotive alternator according to Embodiment 1 of the present invention.
Figure 4:
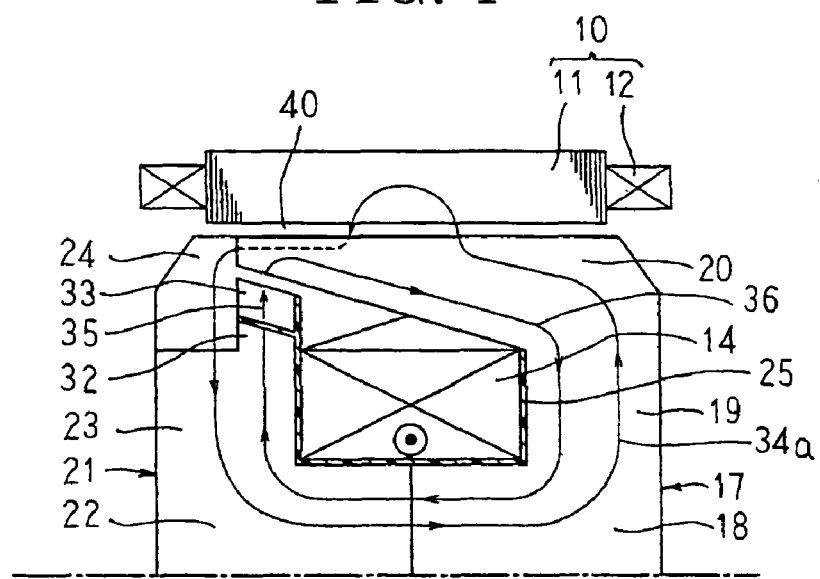
FIG. 4 is a schematic diagram for explaining flow of magnetic flux in the automotive alternator according to Embodiment 1 of the present invention.
Figure 5:
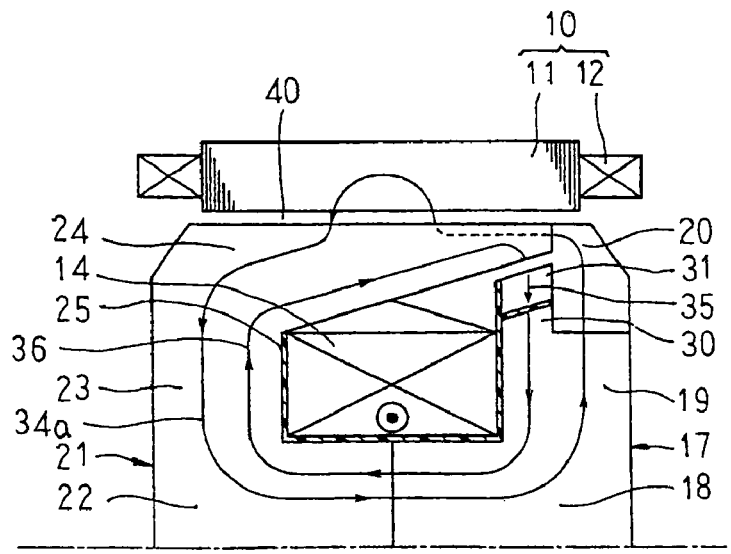
FIG. 5 is a schematic diagram for explaining flow of magnetic flux in the automotive alternator according to Embodiment 1 of the present invention.

FIG. 1 is a cross section that schematically shows an automotive alternator according to Embodiment 1 of the present invention, FIG. 2 is a perspective that shows a rotor that can be used in the automotive alternator according to Embodiment 1 of the present invention, FIG. 3 is a perspective that shows a bobbin into which permanent magnets have been incorporated in the automotive alternator according to Embodiment 1 of the present invention, and FIGS. 4 and 5 are respective schematic diagrams for explaining flow of magnetic flux in the automotive alternator according to Embodiment 1 of the present invention.

In FIGS. 1 through 3, an automotive alternator 1 includes: a case 4 that is constituted by a front bracket 2 and a rear bracket 3 that are each made of aluminum in an approximate cup shape; a rotor 13 that is rotatably disposed inside the case 4 such that a shaft 16 is supported by means of bearings 5 in the case 4; a pulley 6 that is fixed to an end portion of the shaft 16 that projects outward at a front end of the case 4; fans 7 that are fixed to two axial end surfaces of the rotor 13; a stator 10 that is fixed to the case 4 so as to surround an outer circumference of the rotor 13 so as to have a constant air gap relative to the rotor 13; a pair of slip rings 8 that are fixed to a rear end of the shaft 16, and that supply current to the rotor 13; and a pair of brushes 9 that are disposed inside the case 4 so as to slide on the respective slip rings 8. Moreover, although not shown, a rectifier that rectifies an alternating current that is generated in the stator 10 into direct current, and a voltage regulator that adjusts magnitude of an alternating voltage generated in the stator 10, etc., are disposed inside the case 4.

The stator 10 includes: a cylindrical stator core 11; and a stator coil 12 that is mounted to the stator core 11, and in which an alternating current arises due to changes in magnetic flux from a field coil 14 (described below) that accompany rotation of the rotor 13.

The rotor 13 includes: a field coil 14 that is wound onto a bobbin 25, and that generates magnetic flux on passage of an excitation current; a pole core 15 that is disposed so as to cover the field coil 14 and the bobbin 25, and in which magnetic poles are formed by that magnetic flux; and the shaft 16, which is fitted through a central axial position of the pole core 15.

The pole core 15 is configured so as to be divided into first and second pole core bodies 17 and 21.

The first pole core body 17 is prepared by a cold forging manufacturing method using a low carbon steel such as S10C, for example, and has: a first boss portion 18 that has an outer circumferential surface that has a cylindrical shape, and through which a shaft insertion aperture is disposed at a central axial position; a thick ring-shaped first yoke portion 19 that is disposed so as to extend radially outward from a first end edge portion of the first boss portion 18; first claw-shaped magnetic pole portions 20 that are disposed so as to extend toward a second axial end from outer circumferential portions of the first yoke portion 19; and first magnet seat portions 30 that are disposed so as to project integrally from portions of the first yoke portion 19 between adjacent first claw-shaped magnetic pole portions 20. Eight, for example, first claw-shaped magnetic pole portions 20 are formed into a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 19 at a uniform angular pitch circumferentially.

The second pole core body 21 is prepared by a cold forging manufacturing method using a low carbon steel such as S10C, for example, and has: a second boss portion 22 that has an outer circumferential surface that has a cylindrical shape, and through which a shaft insertion aperture is disposed at a central axial position; a thick ring-shaped second yoke portion 23 that is disposed so as to extend radially outward from a second end edge portion of the second boss portion 22; second claw-shaped magnetic pole portions 24 that are disposed so as to extend toward a first axial end from outer circumferential portions of the second yoke portion 23; and second magnet seat portions 32 that are disposed so as to project integrally from portions of the second yoke portion 23 between adjacent second claw-shaped magnetic pole portions 24. Eight, for example, second claw-shaped magnetic pole portions 24 are formed into a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 23 at a uniform angular pitch circumferentially.

Here, outer circumferential surfaces of the first magnet seat portions 30 are prepared into inclined surfaces that are approximately parallel to inner circumferential surfaces near the tip ends of the second claw-shaped magnetic pole portions 24. Moreover, the first magnet seat portions 30 are prepared by a cold forging manufacturing method using a low carbon steel such as S10C, for example, and are fixed to outer circumferential surfaces of the portions of the first yoke portion 19 between the adjacent first claw-shaped magnetic pole portions 20 using an adhesive, etc., and may also be magnetically connected.

Similarly, outer circumferential surfaces of the second magnet seat portions 32 are prepared into inclined surfaces that are approximately parallel to inner circumferential surfaces near the tip ends of the first claw-shaped magnetic pole portions 20. Moreover, the second magnet seat portions 32 are prepared by a cold forging manufacturing method using a low carbon steel such as S10C, for example, and are fixed to outer circumferential surfaces of the portions of the second yoke portion 23 between the adjacent second claw-shaped magnetic pole portions 24 using an adhesive, etc., and may also be magnetically connected.

The bobbin 25 is molded using a resin such as nylon 66, etc., and has: a cylindrical drum portion 25a; and a pair of flange portions 25b that extend radially outward from two axial end portions of the drum portion 25a. In addition, the bobbin 25 has: first magnet housing portions 26 that are disposed integrally on an outer circumferential portion of one of the flange portions 25b so as to be separated in a circumferential direction and so as to extend axially outward; and second magnet housing portions 27 that are disposed integrally on an outer circumferential portion of the other flange portion 25b so as to be separated in a circumferential direction and so as to extend axially outward. Eight, for example, first magnet housing portions 26 are arranged at a uniform angular pitch circumferentially, and eight, for example, second magnet housing portions 27 are arranged at a uniform angular pitch circumferentially so as to be offset by half a pitch relative to the first magnet housing portions 26. The first and second magnet housing portions 26 and 27 are each prepared into angular U-shaped tubular bodies in which a cross section that is perpendicular to a central axis of the drum portion 25a is trapezoidal, and axially inner sides are closed by the flange portions 25b.

This bobbin 25 is installed in the first and second pole core bodies 17 and 21 such that the drum portion 25a is mounted so as to be fitted over the first and second boss portions 18 and 22, and the pair of flange portions 25b are placed alongside inner wall surfaces of the first and second yoke portions 19 and 23. The first magnet housing portions 26 extend over the outer circumferential surfaces of the first magnet seat portions 30 that face the inner circumferential surfaces near the tip ends of each of the second claw-shaped magnetic pole portions 24. The second magnet housing portions 27 extend over the outer circumferential surfaces of the second magnet seat portions 32 that face the inner circumferential surfaces near the tip ends of each of the first claw-shaped magnetic pole portions 20. The first and second magnet housing portions 26 and 27 are each inclined axially outward away from the central axis of the drum portion 25a. Angles of inclination of bottom surfaces of the first and second magnet housing portions 26 and 27 that constitute base sides of the angular U-shaped cross sections approximately match the respective angles of inclination of the inner circumferential surface near the tip ends of the second and first claw-shaped magnetic pole portions 24 and 20.

First permanent magnets 31 are prepared into prisms in which a cross-sectional shape parallel to two end surfaces is trapezoidal, and a cross-sectional shape that includes a central axis is a parallelogram, and are housed and held inside the first magnet housing portions 26 from axially outer openings of the first magnet housing portions 26. The first magnet housing portions 26 are fixed to outer circumferential surfaces of the first magnet seat portions 30 using an adhesive, etc., and the first permanent magnets 31 and the first magnet seat portions 30 are connected magnetically. Here, upper surfaces of each of the first permanent magnets 31 that are constituted by top sides of the angular U-shaped cross sections are exposed from the first magnet housing portions 26, and are approximately parallel to inner circumferential surfaces near the tip ends of the second claw-shaped magnetic pole portions 24 so as to leave a predetermined gap.

Second permanent magnets 33 are prepared into prisms in which a cross-sectional shape parallel to two end surfaces is trapezoidal, and a cross-sectional shape that includes a central axis is a parallelogram, and are housed and held inside the second magnet housing portions 27 from axially outer openings of the second magnet housing portions 27. The second magnet housing portions 27 are fixed to outer circumferential surfaces of the second magnet seat portions 32 using an adhesive, etc., and the second permanent magnets 33 and the second magnet seat portions 32 are connected magnetically. Here, upper surfaces of each of the second permanent magnets 33 that are constituted by top sides of the angular U-shaped cross sections are exposed from the second magnet housing portions 27, and are approximately parallel to inner circumferential surfaces near the tip ends of the first claw-shaped magnetic pole portions 20 so as to leave a predetermined gap.

The first and second permanent magnets 31 and 33 are magnetically oriented in directions of magnetization 35 that are opposite to the orientation of a magnetic field 34 that the field current that flows through the field coil 14 produces in a plane that is perpendicular to a central axis of the rotor 13. In other words, if the magnetic field 34 is generated in the direction of the arrow as shown in FIG. 1 when an electric current is passed through the field coil 14, the first and second permanent magnets 31 and 33 are magnetically oriented in a reverse direction to the magnetic field 34. For example, the directions of magnetization 35 of the first and second permanent magnets 31 and 33 may be oriented radially, and extensions of the directions of magnetization 35 are directed at inner circumferential surfaces near the tip ends of the facing first and second claw-shaped magnetic pole portions 20 and 24. Moreover, in the case of a design in which the orientation of the magnetic field 34 that the field current that flows through the field coil 14 produces is inverted, the first and second permanent magnets 31 and 33 will also be magnetically oriented in a reverse direction.

To assemble a rotor 13 that is configured in this manner, first the field coil 14 is wound onto the drum portion 25a of the bobbin 25, and the first and second permanent magnets 31 and 33 are inserted into the first and second magnet housing portions 26 and 27 from the axially outer openings of the first and second magnet housing portions 26 and 27. At this point, the first and second permanent magnets 31 and 33 may also be fixed to the first and second magnet housing portions 26 and 27 using an adhesive, etc. Thus, as shown in FIG. 3, a bobbin 25 is obtained to which the field coil 14 has been mounted, and in which the first and second permanent magnets 31 and 33 are housed and held in the first and second magnet housing portions 26 and 27.

Next, the first boss portion 18 and the second boss portion 22 are pushed into the drum portion 25a from two axial ends, the first and second claw-shaped magnetic pole portions 20 and 24 are alternately intermeshed, and a second end surface of the first boss portion 18 is abutted to a first end surface of the second boss portion 22. Then, the first and second pole core bodies 17 and 21 are fixed to the shaft 16 and integrated by press-fitting the shaft 16 into the shaft insertion apertures of the first and second boss portions 18 and 22.

The bobbin 25 is mounted such that the drum portion 25a is mounted so as to be fitted over the first and second boss portions 18 and 22, and the first and second flange portions 25b lie alongside the inner wall surface of the first and second yoke portions 19 and 23. The first and second magnet housing portions 26 and 27 extend over the outer circumferential surfaces of the first and second magnet seat portions 30 and 32 that face the inner circumferential surfaces near the tip ends of the second and first claw-shaped magnetic pole portions 24 and 20, and are fixed onto the outer circumferential surfaces of the first and second magnet seat portions 30 and 32 using an adhesive, etc. In a rotor 13 that has been assembled in this manner, the first and second permanent magnets 31 and 33 are disposed such that cross sections that are perpendicular to the central axis of the shaft 16 are trapezoids, and cross sections that include the central axis of the shaft 16 are parallelograms.

The field coil 14 that has been wound onto the bobbin 25, is mounted in a space that is surrounded by the first and second boss portions 18 and 22, the first and second yoke portions 19 and 23, the first and second claw-shaped magnetic pole portions 20 and 24, and the first and second magnet seat portions 30 and 32. Here, the first and second boss portions 18 and 22 and the first and second yoke portions 19 and 23 correspond to a boss portion and first and second yoke portions of the pole core 15. Furthermore, tip end portions of the first and second claw-shaped magnetic pole portions 20 and 24 respectively overlap with the second and first yoke portions 23 and 19 in an axial direction.

Next, action of an automotive alternator 1 that has been configured in this manner will be explained. First, current is supplied from a battery (not shown) to the field coil 14 of the rotor 13 by means of the brushes 9 and the slip rings 8, generating magnetic flux. The first claw-shaped magnetic pole portions 20 of the first pole core body 17 are magnetized into North-seeking (N) poles by this magnetic flux, and the second claw-shaped magnetic pole portions 24 of the second pole core body 21 are magnetized into South-seeking (S) poles. At the same time, rotational torque from an engine is transmitted to the shaft 16 by means of a belt (not shown) and the pulley 6, rotating the rotor 13. Thus, a rotating magnetic field is applied to the stator coil 12 of the stator 10, generating electromotive forces in the stator coil 12. These alternating-current electromotive forces are rectified into direct current by the rectifier to charge the battery or to be supplied to electric loads, etc.

Next, action of the magnetic flux will be explained with reference to FIGS. 3 and 4.

First, magnetic flux 34a is generated when an electric current is passed through the field coil 14. This magnetic flux 34a enters tooth portions of the stator core 11 by passing through the air gap 40 from the first claw-shaped magnetic pole portions 20. The magnetic flux 34a then moves circumferentially through a core back portion from the tooth portions of the stator core 11, and enters neighboring second claw-shaped magnetic pole portions 24 by passing through the air gap 40 from the tooth portions that face those second claw-shaped magnetic pole portions 24. Next, the magnetic flux 34a that has entered the second claw-shaped magnetic pole portions 24 passes through the second yoke portion 23, the second boss portion 22, the first boss portion 18, and the first yoke portion 19, and reaches the first claw-shaped magnetic pole portions 20. Now, in a conventional Lundell rotor, because the first and second pole core bodies are at their design limit, they are magnetically saturated by the magnetic field that is generated by the field coil, reducing magnetic flux that is generated by the rotor.

In Embodiment 1, the first and second permanent magnets 31 and 33 are magnetically oriented so as to be opposite to the orientation of the magnetic field 34 that is generated by the field coil 14. Thus, the orientation of the magnetic field that originates from the first and second permanent magnets 31 and 33 is in a reverse direction to the magnetic field 34 that is generated by the field coil 14. To interlink with the stator core 11, it is necessary for the magnetic flux 36 that originates from these first and second permanent magnets 31 and 33 to make a round trip across the air gap 40, which has a large magnetic resistance. The first and second permanent magnets 31 and 33 are disposed radially inside the second and first claw-shaped magnetic pole portions 24 and 20, and are disposed so as to circuit in a shorter magnetic path length than the inner circumferential surface sides of the first and second claw-shaped magnetic pole portions 20 and 24. Thus, a large portion of the magnetic flux 36 forms a closed magnetic circuit inside the rotor without going around through the stator core 11.

In other words, the magnetic flux 36 that originates from the first permanent magnets 31 passes from the first magnet seat portions 30 through the first yoke portion 19, the first boss portion 18, the second boss portion 22, the second yoke portion 23, and the second claw-shaped magnetic pole portions 24, and returns to the first permanent magnets 31. The magnetic flux 36 that originates from the second permanent magnets 33 enters the first claw-shaped magnetic pole portions 20 by means of the air gap, passes through the first yoke portion 19, the first boss portion 18, the second boss portion 22, the second yoke portion 23, and the second magnet seat portions 32, and returns to the second permanent magnets 33. Thus, the magnetic flux 36 that originates from the first and second permanent magnets 31 and 33 is in a reverse direction from the magnetic flux 34a that originates from the field coil 14, enabling the magnetic flux density of the magnetic bodies that constitute the first and second pole core bodies 17 and 21 to be reduced significantly, thereby enabling magnetic saturation to be relieved.

Figure 6:
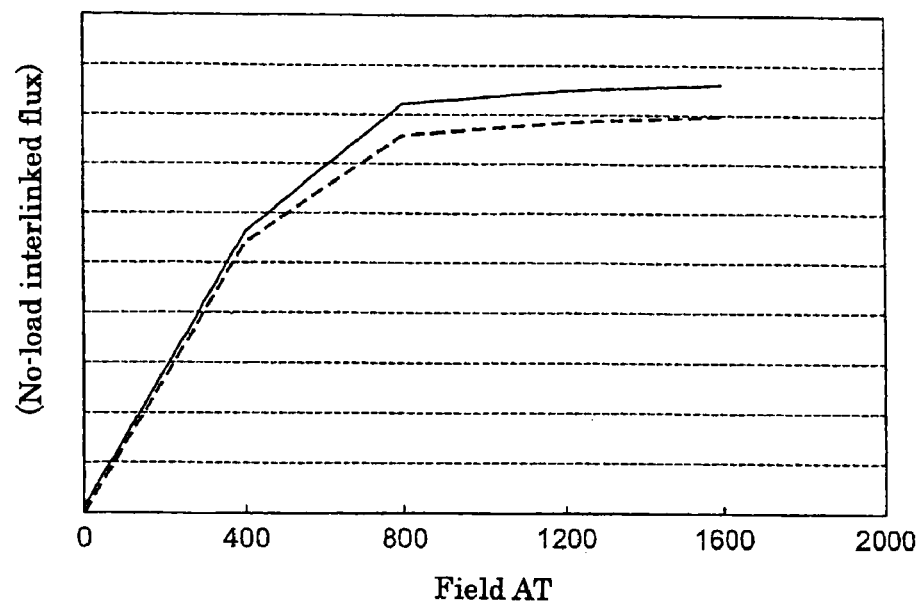
FIG. 6 is a graph that represents a relationship between field ampere turns (AT) and stator interlinked magnetic flux in the automotive alternator according to Embodiment 1 of the present invention.
Figures 7, 8:
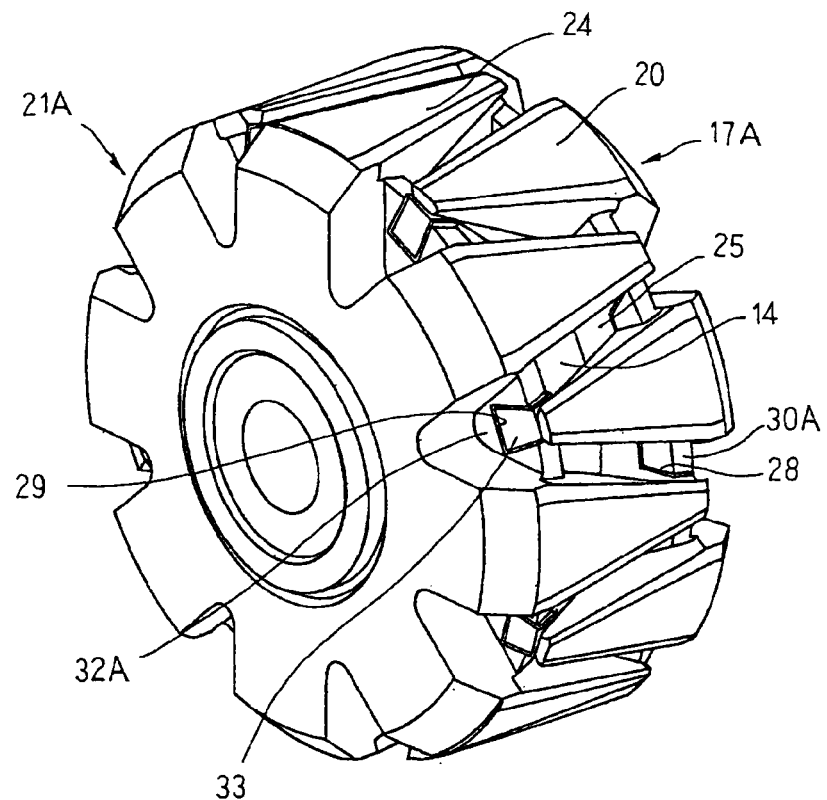
FIG. 7 is a table that shows generated power relative to rotational frequency in the automotive alternator according to Embodiment 1 of the present invention.
FIG. 8 is a perspective that shows a rotor that can be used in an automotive alternator according to Embodiment 2 of the present invention.

Next, stator interlinked magnetic flux relative to field ampere turns (field AT) and generated power relative to rotational frequency were measured using an automotive alternator 1 that was configured in this manner, and the results are shown in FIGS. 6 and 7. For comparison, a conventional device from which the first and second permanent magnets 31 and 33 were omitted was prepared, stator interlinked magnetic flux relative to field ampere turns (field AT) and generated power (direct current A) relative to rotational frequency were measured, and the results are also shown in FIGS. 6 and 7. Moreover, in FIG. 6, a solid line represents the present invention, and a broken line represents the conventional device.

It can be seen from FIG. 6 that the difference between the automotive alternator 1 and the conventional device is small in a region in which field AT is small, and the difference between the automotive alternator 1 and the conventional device increases when a region in which magnetic saturation begins is exceeded. In other words, it can be seen that disposing the first and second permanent magnets 31 and 33 relieves magnetic saturation, thereby increasing the amount of magnetic flux that interlinks with the stator 10. Similarly, it can be seen from FIG. 7 that greater generated power can be obtained in the automotive alternator 1 than in the conventional device, particularly in a low rotational range.

In other words, in conventional devices, thirty percent or more of the magnetomotive force of the field is expended in the magnetic circuit of the rotor as a result of magnetic saturation, making it difficult to increase the amount of magnetic flux. In Embodiment 1, on the other hand, because magnetic saturation is relieved as described above, it can be inferred that the magnetic flux that interlinks with the stator 10 is increased, increasing generated power. In particular, it has been confirmed that generated power can be increased significantly in a low-speed idling region where magnetic saturation is pronounced.

Since the first and second pole core bodies 17 and 21 are made generally by a cold forging manufacturing method, it would be difficult to increase the shape or dimensional precision of the first and second magnet seat portions 30 and 32 simply by forging, and three-dimensional cutting processes such as by three-dimensional numerically controlled (NC) milling machines, etc., would be necessary, requiring machining time. In Embodiment 1, because the first and second permanent magnets 31 and 33 are fixed on outer circumferential surfaces of the first and second magnet seat portions 30 and 32 so as to be housed in the first and second magnet housing portions 26 and 27 of the resin bobbin 25, the shape or dimensional precision of the first and second magnet seat portions 30 and 32 can be reduced. Consequently, the need for cutting processes using three-dimensional NC milling machines, etc., is eliminated, enabling manufacturing time to be shortened, and also enabling manufacturing costs to be reduced.

Mounting the first and second permanent magnets 31 and 33 to the first and second magnet seat portions 30 and 32 individually in a magnetized state is extremely complicated, and also requires procedures such as demagnetizing all devices, etc. In Embodiment 1, because the first and second permanent magnets 31 and 33 are mounted to the first and second magnet seat portions 30 and 32 so as to be housed in the first and second magnet housing portions 26 and 27 of the bobbin 25, the first and second permanent magnets 31 and 33 can be mounted to the first and second magnet seat portions 30 and 32 simultaneously during a step of mounting the field coil 14 to the first and second pole core bodies 17 and 21, reducing the number of assembly steps, and also enabling assembly to be improved. Because the bobbin 25 is a nonmagnetic body, housing of the first and second permanent magnets 31 and 33 in the first and second magnet housing portions 26 and 27 is facilitated. In addition, handling of the bobbin 25 by robots or automatic equipment is facilitated, eliminating the need to demagnetize all devices.

The first and second permanent magnets 31 and 33 are mounted to the first and second magnet seat portions 30 and 32 that is disposed so as to project from the first and second yoke portions 19 and 23 so as to be housed and held in the first and second magnet housing portions 26 and 27. Thus, relative changes in the first and second claw-shaped magnetic pole portions 20 and 24 that result from centrifugal forces or thermal expansion do not affect magnet holding, enabling the magnet holding construction to be strengthened, and also enabling magnet holding reliability to be increased.

Because the first and second permanent magnets 31 and 33 are housed and held in the resin first and second magnet housing portions 26 and 27, the first and second magnet housing portions 26 and 27 play roles as buffer layers relative to the first and second magnet seat portions 30 and 32. Thus, even if the first and second permanent magnets 31 and 33 are moved by centrifugal force, occurrences of cracking or scattering of the magnets are suppressed.

Because axially inner sides of the first and second magnet housing portions 26 and 27 are closed by the flange portions 25b, the first and second permanent magnets 31 and 33 are separated from the field coil 14, etc., by the flange portions 25b. Thus, heat that has been emitted from the field coil 14 is blocked from arriving at the first and second permanent magnets 31 and 33 by the flange portions 25b. Because the base sides of the angular U-shaped cross sections of the first and second magnet housing portions 26 and 27 are interposed between the first and second permanent magnets 31 and 33 and the first and second magnet seat portions 30 and 32, a heat transfer pathway of heat that is generated in the field coil 14 through the pole core 15 to the first and second permanent magnets 31 is blocked. Thus, temperature increases in the first and second permanent magnets 31 and 33 that result from heat that is generated in the field coil 14 are reduced, enabling thermal demagnetization to be suppressed.

Because the first and second permanent magnets 31 and 33 are disposed so as to face the inner circumferential surfaces near the tip ends of the second and first claw-shaped magnetic pole portions 24 and 20, the first and second permanent magnets 31 and 33 are positioned radially inside the second and first claw-shaped magnetic pole portions 24 and 20 and are not directly heated by induction due to stator slot harmonics, enabling thermal demagnetization to be prevented.

Because the first and second permanent magnets 31 and 33 are disposed so as to face the inner circumferential surfaces near the tip ends of the second and first claw-shaped magnetic pole portions 24 and 20, the magnetic circuits of the first and second permanent magnets 31 and 33 are closed magnetic circuits inside the rotor, eliminating magnetic flux components that interlink with the stator 10. Thus, the occurrence of voltages induced by the first and second permanent magnets 31 and 33 during no-load de-energization is suppressed. As a result, the magnet volume of the first and second permanent magnets 31 and 33 can be increased.

Because the first and second permanent magnets 31 and 33 are positioned radially inside the second and first claw-shaped magnetic pole portions 24 and 20, increases in moment of inertia that result from the first and second permanent magnets 31 and 33 being disposed can be reduced, also enabling increases in inertia torque to be suppressed.

Because the first and second permanent magnets 31 and 33 are prepared into prisms, the first and second permanent magnets 31 and 33 can be cut out of a magnet base material efficiently using an abrasive wheel, increasing material yield.

Embodiment 2

Figure 9:
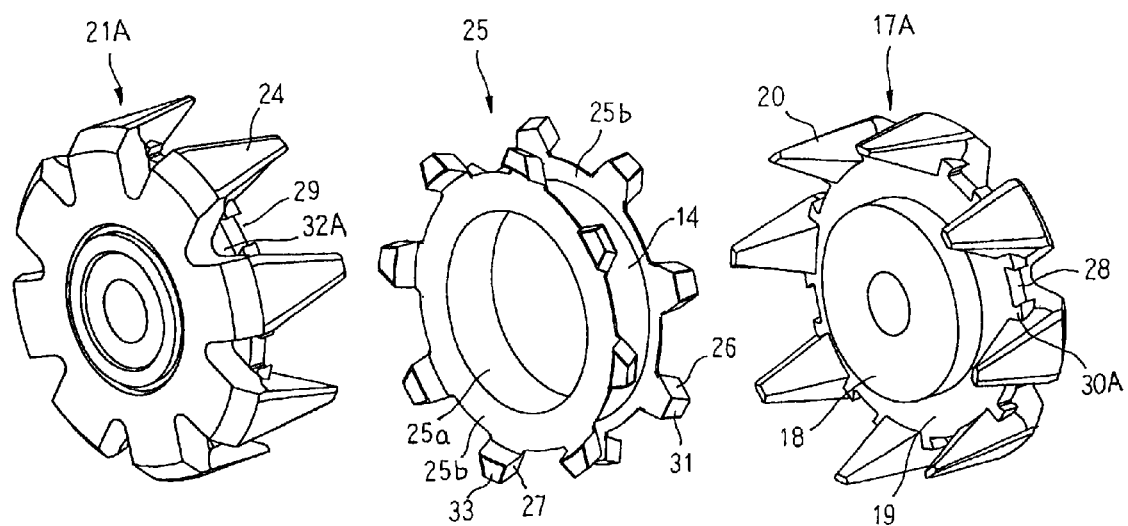
FIG. 9 is an exploded perspective that explains a configuration of the rotor that can be used in the automotive alternator according to Embodiment 2 of the present invention.

FIG. 8 is a perspective that shows a rotor that can be used in an automotive alternator according to Embodiment 2 of the present invention, and FIG. 9 is an exploded perspective that explains a configuration of the rotor that can be used in the automotive alternator according to Embodiment 2 of the present invention.

In FIGS. 8 and 9, first magnet seat portions 30A are disposed so as to project integrally on portions of a first yoke portion 19 between adjacent first claw-shaped magnetic pole portions 20, and outer circumferential surfaces thereof are formed into cylindrical surfaces that have an axial center of a first pole core body 17A as a central axis. First interfitting grooves 28 that function as interfitting recess portions that have trapezoidal cross sections perpendicular to the central axis of the first pole core body 17A are recessed into portions of outer circumferential surfaces of the first magnet seat portions 30A that face inner circumferential surfaces near tip ends of second claw-shaped magnetic pole portions 24 such that bottom surfaces thereof are inclined surfaces that are approximately parallel to the inner circumferential surfaces near the tip ends of the second claw-shaped magnetic pole portions 24 and so as to have groove directions that are parallel to the central axis of the first pole core body 17A. First permanent magnets 31 are fitted into the first interfitting grooves 28 from axially inside so as to be housed and held in the first magnet housing portions 26. Here, the first magnet housing portions 26 may also be fixed to the first magnet seat portions 30A using an adhesive, etc.

Second magnet seat portions 32A are disposed so as to project integrally on portions of a second yoke portion 23 between adjacent second claw-shaped magnetic pole portions 24, and outer circumferential surfaces thereof are formed into cylindrical surfaces that have an axial center of a second pole core body 21A as a central axis. Second interfitting grooves 29 that function as interfitting recess portions that have trapezoidal cross sections perpendicular to the central axis of the second pole core body 21A are recessed into portions of outer circumferential surfaces of the second magnet seat portions 32A that face inner circumferential surfaces near tip ends of first claw-shaped magnetic pole portions 20 such that bottom surfaces thereof are inclined surfaces that are approximately parallel to the inner circumferential surfaces near the tip ends of the first claw-shaped magnetic pole portions 20 and so as to have groove directions that are parallel to the central axis of the second pole core body 21A. Second permanent magnets 33 are fitted into the second interfitting grooves 29 from axially inside so as to be housed and held in the second magnet housing portions 27. Here, the second magnet housing portions 27 may also be fixed to the second magnet seat portions 32A using an adhesive, etc.

Moreover, the rest of the configuration is configured in a similar manner to Embodiment 1 above.

Consequently, according to Embodiment 2, effects can be achieved in a similar manner to Embodiment 1 above.

In a rotor 13A according to Embodiment 2, the first and second magnet housing portions 26 and 27 in which the first and second permanent magnets 31 and 33 are housed and held are fitted into and held by first and second interfitting grooves 28 and 29 that are recessed into the first and second magnet seat portions 30A and 32A. Thus, because radially outward movement of the first and second permanent magnets 31 and 33 is prevented structurally by being fitted together with the first and second interfitting grooves 28 and 29, the first and second permanent magnets 31 and 33 can be held stably for a long time by the first and second magnet seat portions 30A and 32A. The first and second magnet housing portions 26 and 27 that are interposed between the first and second permanent magnets 31 and 33 and the first and second magnet seat portions 30A and 32A also function as buffer layers, suppressing occurrences of cracking of the first and second permanent magnets 31 and 33.

Embodiment 3

Figure 10:
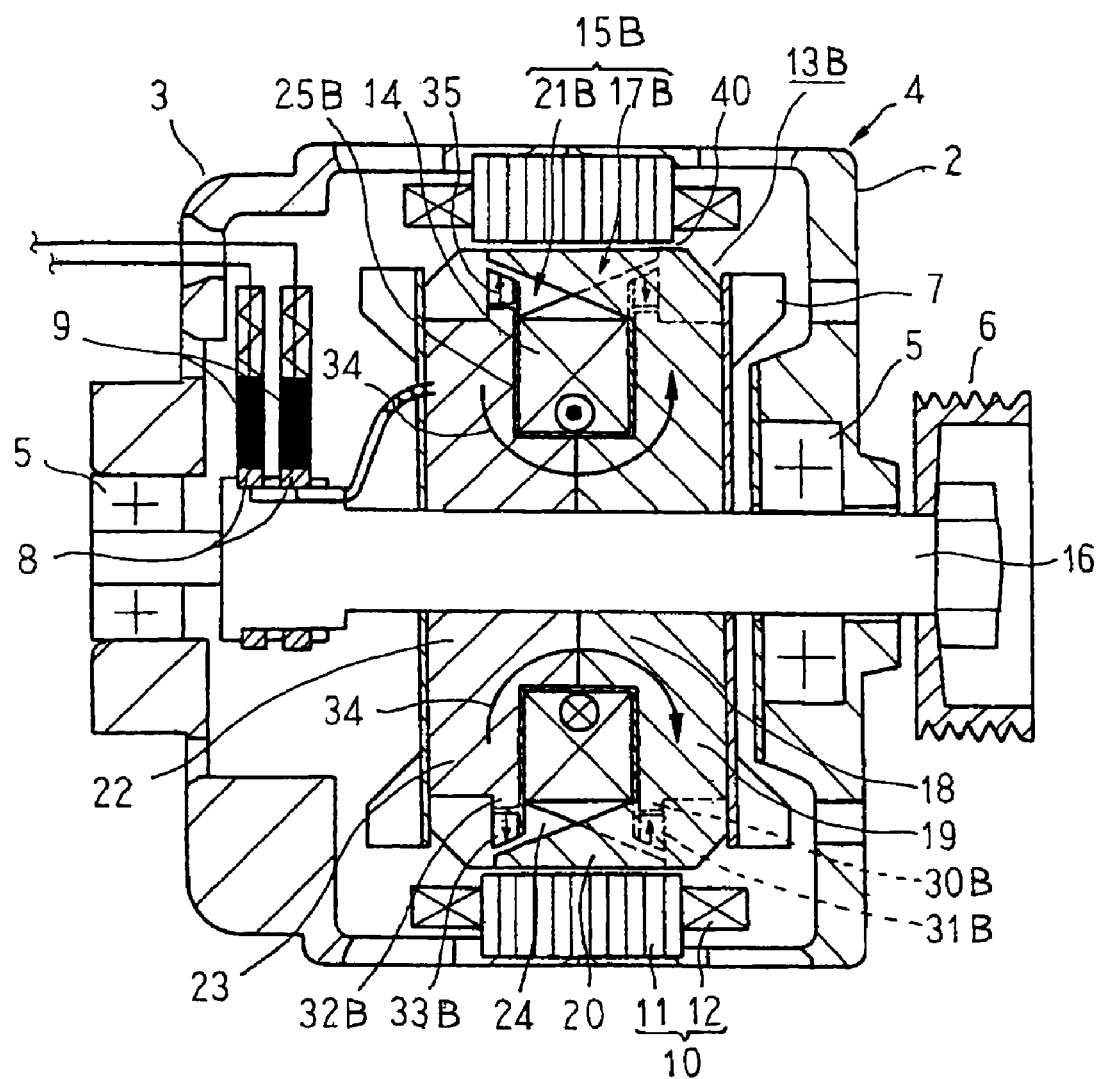
FIG. 10 is a cross section that schematically shows an automotive alternator according to Embodiment 3 of the present invention.
Figure 11:
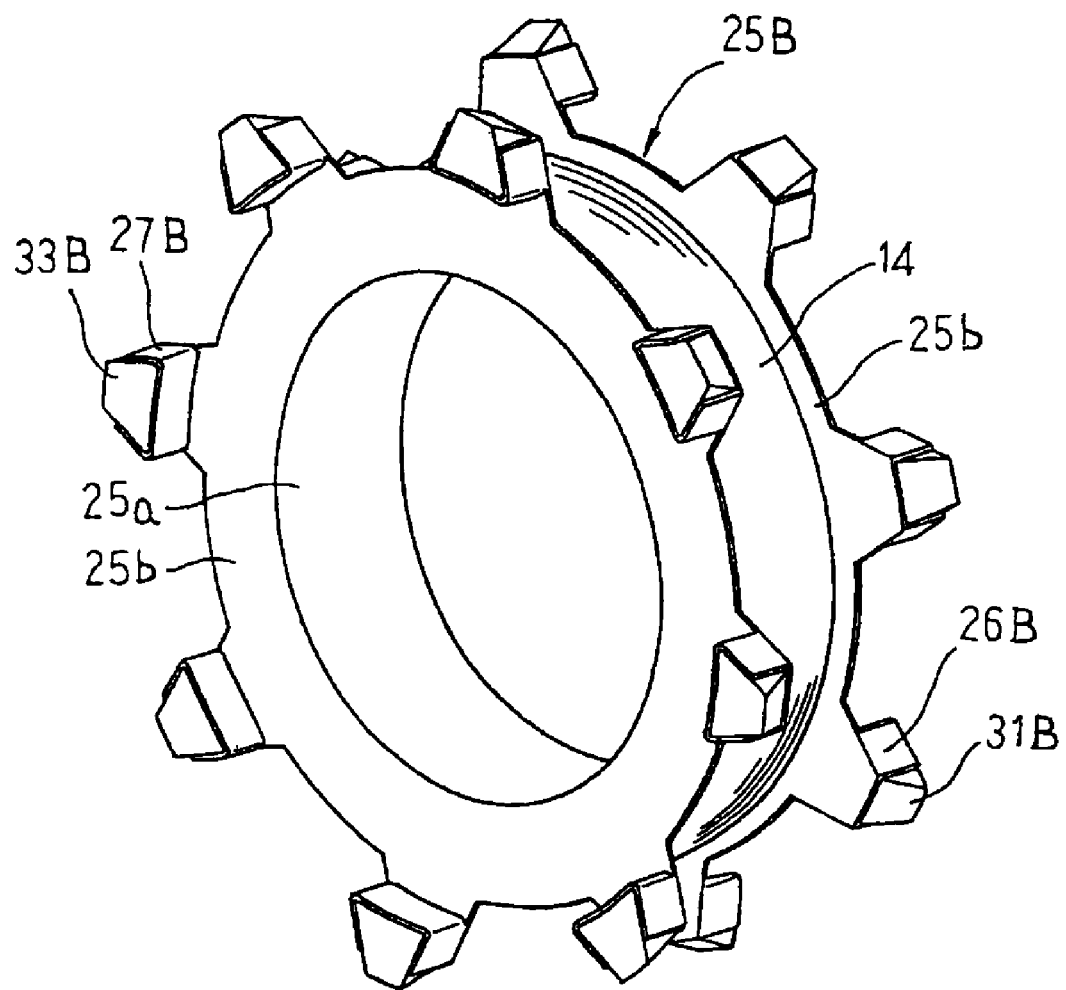
FIG. 11 is a perspective that shows a bobbin into which permanent magnets have been incorporated in the automotive alternator according to Embodiment 3 of the present invention.

FIG. 10 is a cross section that schematically shows an automotive alternator according to Embodiment 3 of the present invention, and FIG. 11 is a perspective that shows a bobbin into which permanent magnets have been incorporated in the automotive alternator according to Embodiment 3 of the present invention.

In FIGS. 10 and 11, first magnet seat portions 30B are disposed so as to project integrally on portions of a first yoke portion 19 between adjacent first claw-shaped magnetic pole portions 20, and outer circumferential surfaces thereof are formed into flat surfaces that are tangential to cylindrical surfaces that have an axial center of a first pole core body 17B as a central axis. First magnet housing portions 26B are prepared into angular U-shaped tubular bodies in which a cross section that is perpendicular to a central axis of a drum portion 25a of a bobbin 25B is trapezoidal, and axially inner sides are closed by a flange portion 25b. Bottom surfaces of the angular U-shaped tubular bodies of the first magnet housing portions 26B are formed into flat surfaces that are tangential to a cylindrical surface that has the central axis of the drum portion 25a as a central axis. First permanent magnets 31B are prepared into prisms in which a cross-sectional shape parallel to two end surfaces is trapezoidal, a bottom surface that is constituted by a base side of the trapezoidal cross section is a flat surface that is perpendicular to the end surfaces, and an upper surface that is constituted by a top side of the trapezoidal cross section is an inclined surface that is approximately parallel to an inner circumferential surface near a tip end of second claw-shaped magnetic pole portions 24. The first permanent magnets 31B are housed and held inside the first magnet housing portions 26B from axially outer openings of the first magnet housing portions 26B. The first magnet housing portions 26B are fixed to the outer circumferential surfaces of the first magnet seat portions 30B that face the inner circumferential surfaces near the tip ends of the second claw-shaped magnetic pole portions 24 using an adhesive, etc.

Second magnet seat portions 32B are disposed so as to project integrally on portions of a second yoke portion 23 between adjacent second claw-shaped magnetic pole portions 24, and outer circumferential surfaces thereof are formed into flat surfaces that are tangential to cylindrical surfaces that have an axial center of a second pole core body 21B as a central axis. Second magnet housing portions 27B are prepared into angular U-shaped tubular bodies in which a cross section that is perpendicular to the central axis of the drum portion 25a of the bobbin 25B is trapezoidal, and axially inner sides are closed by a flange portion 25b. Bottom surfaces of the angular U-shaped tubular bodies of the second magnet housing portions 27B are formed into flat surfaces that are tangential to a cylindrical surface that has the central axis of the drum portion 25a as a central axis. Second permanent magnets 33B are prepared into prisms in which a cross-sectional shape parallel to two end surfaces is trapezoidal, a bottom surface that is constituted by a base side of the trapezoidal cross section is a flat surface that is perpendicular to the end surfaces, and an upper surface that is constituted by a top side of the trapezoidal cross section is an inclined surface that is approximately parallel to an inner circumferential surface near a tip end of the first claw-shaped magnetic pole portions 20. The second permanent magnets 33B are housed and held inside the second magnet housing portions 27B from axially outer openings of the second magnet housing portions 27B. The second magnet housing portions 27B are fixed to the outer circumferential surfaces of the second magnet seat portions 32B that face the inner circumferential surfaces near the tip ends of the first claw-shaped magnetic pole portions 20 using an adhesive, etc.

Moreover, the rest of the configuration is configured in a similar manner to Embodiment 1 above.

Consequently, according to Embodiment 3, effects can be achieved in a similar manner to Embodiment 1 above.

In a rotor 13B according to Embodiment 3, first and second permanent magnets 31B and 33B are formed such that a cross-sectional shape parallel to two end surfaces is trapezoidal, and a bottom surface that is constituted by a base side of the trapezoidal cross section is a flat surface that is perpendicular to the end surfaces, and first and second magnet housing portions 26B and 27B are formed so as to have flat surfaces that are tangential to a cylindrical surface that has the central axis of the drum portion 25a as a central axis. Thus, the first and second permanent magnets 31B and 33B can be inserted into the first and second magnet housing portions 26B and 27B simply by being moved parallel to the central axis of the drum portion 25a. Thus, work mounting the first and second permanent magnets 31B and 33B to the first and second magnet housing portions 26B and 27B is facilitated.

Facing surfaces between the first and second magnet housing portions 26B and 27B and the first and second magnet seat portions 30B and 32B are formed into flat surfaces that are tangential to cylindrical surfaces that have the central axes of the first and second pole core bodies 17B and 21B as central axes. Thus, assembly work on the pole core 15B and joining work between the first and second magnet housing portions 26B and 27B and the first and second magnet seat portions 30B and 32B are facilitated.

Moreover, in Embodiment 3 above, first and second magnet housing portions in which the first and second permanent magnets are housed and held are fixed to the outer circumferential surfaces of the first and second magnet seat portions using an adhesive, etc., but first and second interfitting grooves may also be recessed into the outer circumferential surfaces of the first and second magnet seat portions, and the first and second magnet housing portions in which the first and second permanent magnets are housed and held fitted into the first and second interfitting grooves, in a similar manner to Embodiment 2 above. In that case, bottom surfaces that are constituted by base sides of trapezoidal cross sections of the first and second interfitting grooves are formed into flat surfaces that are tangential to cylindrical surfaces that are perpendicular to a central axis of a shaft.

In Embodiments 1 through 3 above, first and second permanent magnets are prepared into prisms in which cross sections that are parallel to end surfaces are trapezoidal, but the cross-sectional shapes that are parallel to the end surfaces of the first and second permanent magnets are not limited to being trapezoidal, and may also be quadrilateral, such as square or rectangular. In that case, it goes without saying that cross-sectional shapes of the first and second magnet housing portions and groove shapes of the first and second interfitting grooves will also be formed so as to have shapes that conform to cross-sectional shapes that are parallel to the end surfaces of the first and second permanent magnets. Moreover, it also goes without saying that chamfering or rounding may also be applied to corner portions of the quadrilateral cross sections of the permanent magnets.

In Embodiments 1 through 3 above, axially outer sides of the magnet housing portions are open and axially inner sides are closed, but axially inner sides of the magnet housing portions may also be open and axially outer sides closed. In that case, permanent magnets are housed in the magnet housing portions from axially inside, and axially outward dislodgment of the permanent magnets is suppressed.

Embodiment 4

Figure 12:
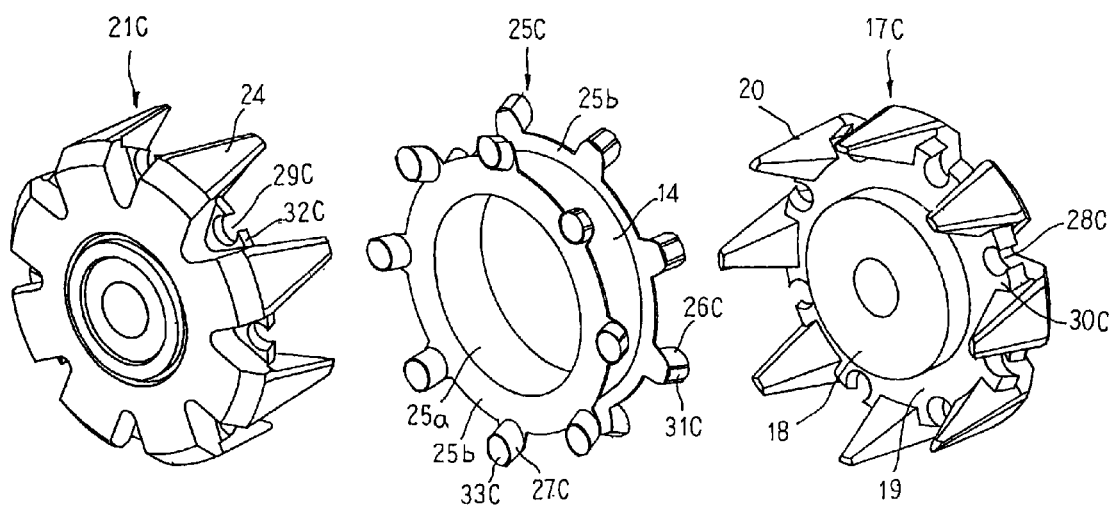
FIG. 12 is an exploded perspective that explains a configuration of a rotor that can be used in an automotive alternator according to Embodiment 4 of the present invention.
Figure 13:
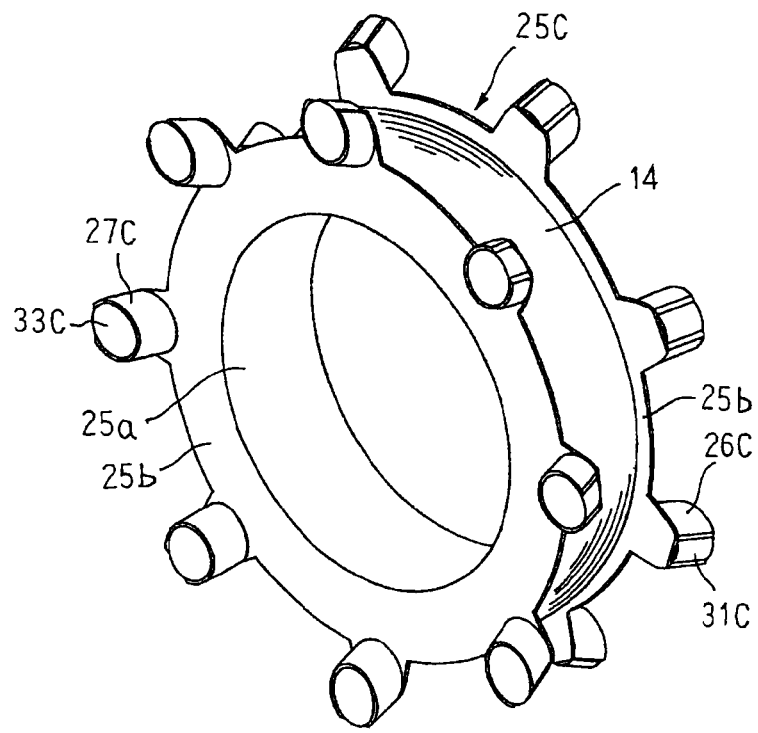
FIG. 13 is a perspective that shows a bobbin into which permanent magnets have been incorporated in the automotive alternator according to Embodiment 4 of the present invention.

FIG. 12 is an exploded perspective that explains a configuration of a rotor that can be used in an automotive alternator according to Embodiment 4 of the present invention, and FIG. 13 is a perspective that shows a bobbin into which permanent magnets have been incorporated in the automotive alternator according to Embodiment 4 of the present invention.

In FIGS. 12 and 13, first interfitting grooves 28C are recessed into portions of outer circumferential surfaces of first magnet seat portions 30C that face inner circumferential surfaces near tip ends of second claw-shaped magnetic pole portions 24 so as to have cross sections perpendicular to a central axis of a first pole core body 17C that are C-shaped circular arcs and so as to have aperture centers that are approximately parallel to the inner circumferential surfaces near the tip ends of the second claw-shaped magnetic pole portions 24. First magnet housing portions 26C are prepared into tubular bodies in which a cross section that is perpendicular to a central axis of a drum portion 25a of a bobbin 25C is a C-shaped circular arc, and axially inner sides are closed by a flange portion 25b. Angles of inclination of central axes of these first magnet housing portions 26C match approximately with angles of inclination of the tip end inner circumferential surfaces of the second claw-shaped magnetic pole portions 24.

First permanent magnets 31C are prepared into cylindrical bodies in which a cross-sectional shape parallel to two end surfaces is circular, and a cross-sectional shape that includes a central axis is a parallelogram, and are housed and held inside the first magnet housing portions 26C from axially outer openings of the first magnet housing portions 26C. First permanent magnets 31C are fitted into the first interfitting grooves 28C from axially inside so as to be housed and held in the first magnet housing portions 26C. Here, a portion of an outer circumferential surface of each of the first permanent magnets 31C are exposed from the first magnet housing portions 26C, and are approximately parallel to the inner circumferential surfaces near the tip ends of the second claw-shaped magnetic pole portions 24 so as to leave a predetermined gap. Here, the first magnet housing portions 26C may also be fixed to the first interfitting grooves 28C using an adhesive, etc.

Second interfitting grooves 29C are recessed into portions of outer circumferential surfaces of second magnet seat portions 32C that face inner circumferential surfaces near tip ends of first claw-shaped magnetic pole portions 20 so as to have cross sections perpendicular to a central axis of a second pole core body 21C that are C-shaped circular arcs and so as to have aperture centers that are approximately parallel to the inner circumferential surfaces near the tip ends of the first claw-shaped magnetic pole portions 20. Second magnet housing portions 27C are prepared into tubular bodies in which a cross section that is perpendicular to the central axis of the drum portion 25a is a C-shaped circular arc, and axially inner sides are closed by a flange portion 25b. Angles of inclination of central axes of these second magnet housing portions 27C match approximately with angles of inclination of the tip end inner circumferential surfaces of the first claw-shaped magnetic pole portions 20.

Second permanent magnets 33C are prepared into cylindrical bodies in which a cross-sectional shape parallel to two end surfaces is circular, and a cross-sectional shape that includes a central axis is a parallelogram, and are housed and held inside the second magnet housing portions 27C from axially outer openings of the second magnet housing portions 27C. The second permanent magnets 33C are fitted into the second interfitting grooves 29C from axially inside so as to be housed and held in the second magnet housing portions 27C. Here, a portion of an outer circumferential surface of each of the second permanent magnets 33C are exposed from the second magnet housing portions 27C, and are approximately parallel to the inner circumferential surfaces near the tip ends of the first claw-shaped magnetic pole portions 20 so as to leave a predetermined gap. The second magnet housing portions 27C may also be fixed to the second interfitting grooves 29C using an adhesive, etc.

Moreover, the rest of the configuration is configured in a similar manner to Embodiment 2 above.

Consequently, according to Embodiment 4, similar effects to those in Embodiment 2 above can be achieved.

According to Embodiment 4, because the first and second interfitting grooves 28C and 29C are formed into tubular shapes that have C-shaped cross sections, the first and second interfitting grooves 28C and 29C can be shaped using only a cold forging manufacturing method. If necessary, aperture dimensional precision of the first and second interfitting grooves 28C and 29C can also be increased by applying after-processing to the first and second pole core bodies 17C and 21C using a rotary cutting tool such as a drill or a reamer, etc., after molding. This after-processing can be performed simply by moving the rotary cutting tool axially relative to the first and second pole core bodies 17C and 21C, enabling dimensional precision of the first and second interfitting grooves 28C and 29C to be increased easily and inexpensively in a short amount of time. Because the first and second permanent magnets 31C and 33C are also formed into cylindrical bodies, they can also be prepared with high dimensional precision easily and inexpensively by molding or external shape cutting.

Because the first and second interfitting grooves 28C and 29C and the first and second permanent magnets 31C and 33C can be prepared with high dimensional precision, the first and second permanent magnets 31C and 33C can be held stably in the first and second interfitting grooves 28C and 29C without wobbling, enabling occurrences of scattering of the magnets to be prevented during high-speed rotation. Because interfitting surfaces between the first and second interfitting grooves 28C and 29C and the first and second permanent magnets 31C and 33C are cylindrical surfaces, local concentrations of stress are eliminated, enabling occurrences of damage to the first and second magnet seat portions 30C and 32C and the first and second permanent magnets 31C and 33C to be suppressed. In addition, the first and second magnet housing portions 26C and 27C that are interposed between the first and second interfitting grooves 28C and 29C and the first and second permanent magnets 31C and 33C function as buffer layers, enabling occurrences of cracking of the first and second permanent magnets 31C and 33C to be suppressed.

Because dimensional errors between the first and second interfitting grooves 28C and 29C and the first and second permanent magnets 31C and 33C can be absorbed by deformation of the first and second magnet housing portions 26C and 27C, it is not necessary to control milling precision with inordinately high precision, enabling manufacturing costs to be reduced.

Embodiment 5

Figure 14:
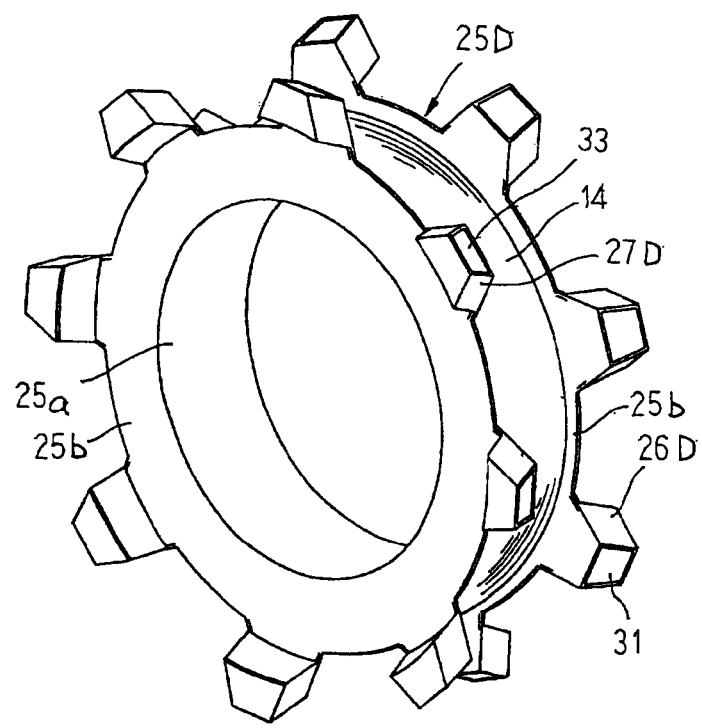
FIG. 14 is a perspective that shows a bobbin into which permanent magnets have been incorporated in an automotive alternator according to Embodiment 5 of the present invention.

FIG. 14 is a perspective that shows a bobbin into which permanent magnets have been incorporated in an automotive alternator according to Embodiment 5 of the present invention.

In FIG. 14, first and second permanent magnets 31 and 33 are insert-molded into a bobbin 25D. The first and second permanent magnets 31 and 33 are respectively embedded in each of first and second magnet housing portions 26D and 27D such that only upper surfaces that are constituted by top sides of trapezoidal cross sections are exposed.

Moreover, the rest of the configuration is configured in a similar manner to Embodiments 1 and 2 above.

Consequently, according to Embodiment 5, similar effects to those in Embodiments 1 and 2 above can be achieved.

According to Embodiment 5, because the first and second permanent magnets 31 and 33 are insert-molded into the bobbin 25D, the first and second permanent magnets 31 and 33 are incorporated into the bobbin 25D and can handled as a single part, improving assembly. Because the first and second permanent magnets 31 and 33 are respectively embedded in each of first and second magnet housing portions 26D and 27D such that only upper surfaces that are constituted by top sides of trapezoidal cross sections are exposed, axial dislodgment of the first and second permanent magnets 31 and 33 can be prevented, increasing magnet holding strength of the bobbin 25D. In addition, exposed surface area of the first and second permanent magnets 31 and 33 is reduced, preventing the first and second permanent magnets 31 and 33 from being damaged and scattered.

Embodiment 6

Figure 15:
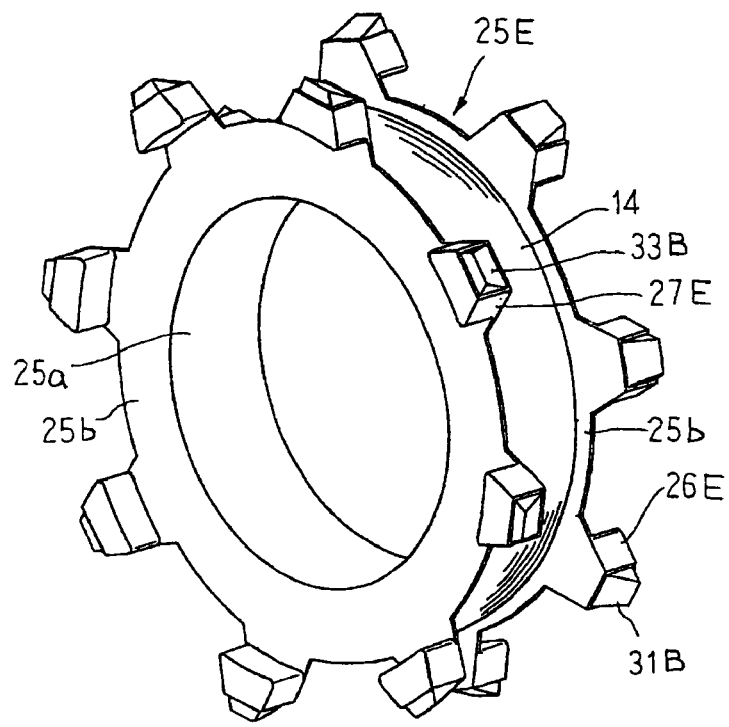
FIG. 15 is a perspective that shows a bobbin into which permanent magnets have been incorporated in an automotive alternator according to Embodiment 6 of the present invention.

FIG. 15 is a perspective that shows a bobbin into which permanent magnets have been incorporated in an automotive alternator according to Embodiment 6 of the present invention.

In FIG. 15, first and second permanent magnets 31B and 33B are insert-molded into a bobbin 25E. The first and second permanent magnets 31B and 33B are respectively embedded in each of first and second magnet housing portions 26E and 27E such that upper surface portions that are constituted by top sides of trapezoidal cross sections are exposed.

Moreover, the rest of the configuration is configured in a similar manner to Embodiment 3 above.

Consequently, according to Embodiment 6, similar effects to those in Embodiment 3 above can be achieved.

According to Embodiment 6, the first and second permanent magnets 31B and 33B are insert-molded into the bobbin 25E. In addition, the first and second permanent magnets 31B and 33B are respectively embedded in each of the first and second magnet housing portions 26E and 27E such that upper surface portions that are constituted by top sides of trapezoidal cross sections are exposed. Thus, similar effects to those of Embodiment 5 above can also be achieved.

Embodiment 7

Figure 16:
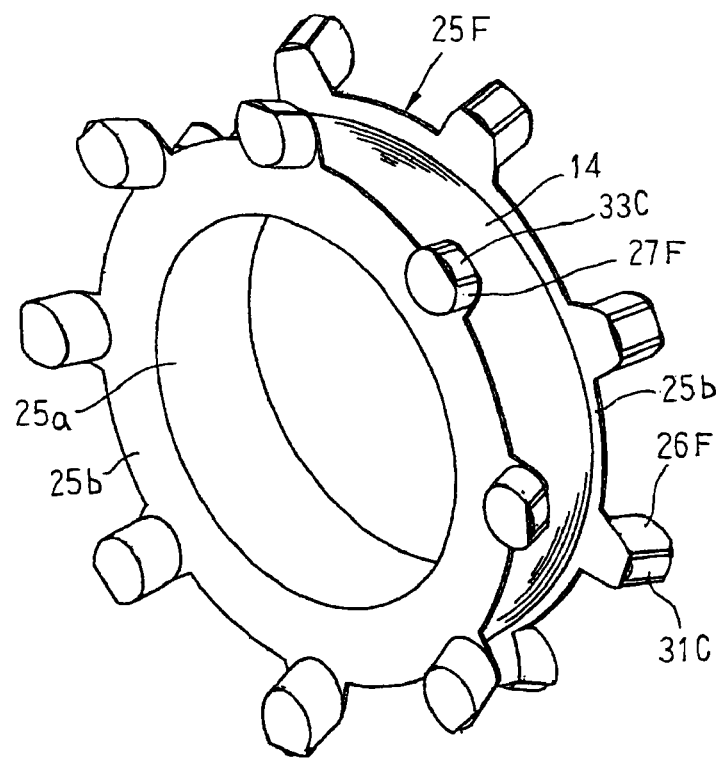
FIG. 16 is a perspective that shows a bobbin into which permanent magnets have been incorporated in an automotive alternator according to Embodiment 7 of the present invention.

FIG. 16 is a perspective that shows a bobbin into which permanent magnets have been incorporated in an automotive alternator according to Embodiment 7 of the present invention.

In FIG. 16, first and second permanent magnets 31C and 33C are insert-molded into a bobbin 25F. The first and second permanent magnets 31C and 33C are respectively embedded in each of first and second magnet housing portions 26F and 27F such that portions of outer circumferential surfaces are exposed.

Moreover, the rest of the configuration is configured in a similar manner to Embodiment 4 above.

Consequently, according to Embodiment 7, similar effects to those in Embodiment 4 above can be achieved.

According to Embodiment 7, the first and second permanent magnets 31C and 33C are insert-molded into the bobbin 25F. In addition, the first and second permanent magnets 31C and 33C are respectively embedded in each of the first and second magnet housing portions 26F and 27F such that portions of outer circumferential surfaces are exposed. Thus, similar effects to those of Embodiment 5 above can also be achieved.

Moreover, in Embodiments 5 through 7 above, first and second permanent magnets are insert-molded into first and second magnet housing portions of a bobbin such that portions that face inner circumferential surfaces near tip ends of second and first claw-shaped magnetic pole portions are exposed, but it is only necessary for at least two axial end surfaces of the first and second permanent magnets and surfaces that face the first and second magnet seat portions to be embedded, and for example, the first and second permanent magnets may also be insert-molded so as to be entirely embedded.

Embodiment 8

Figure 17:
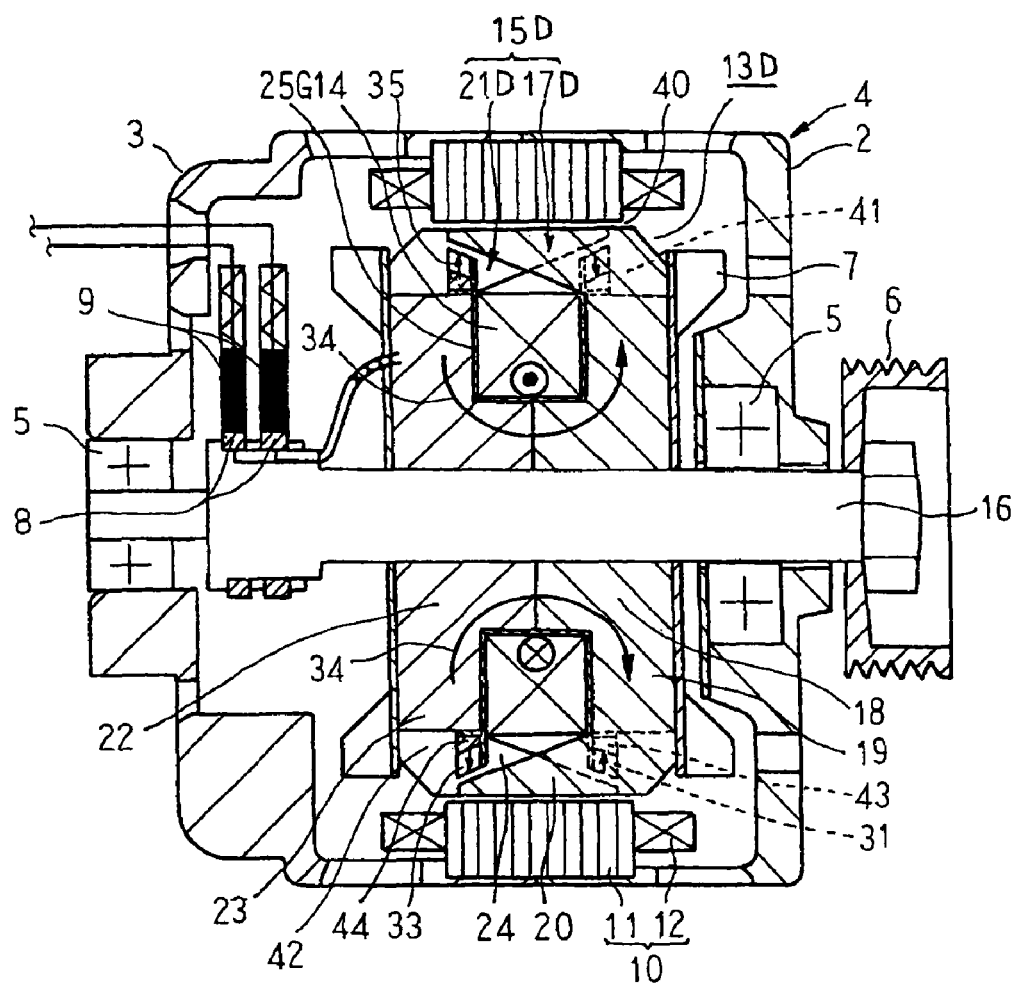
FIG. 17 is a cross section that schematically shows an automotive alternator according to Embodiment 8 of the present invention.
Figure 18:
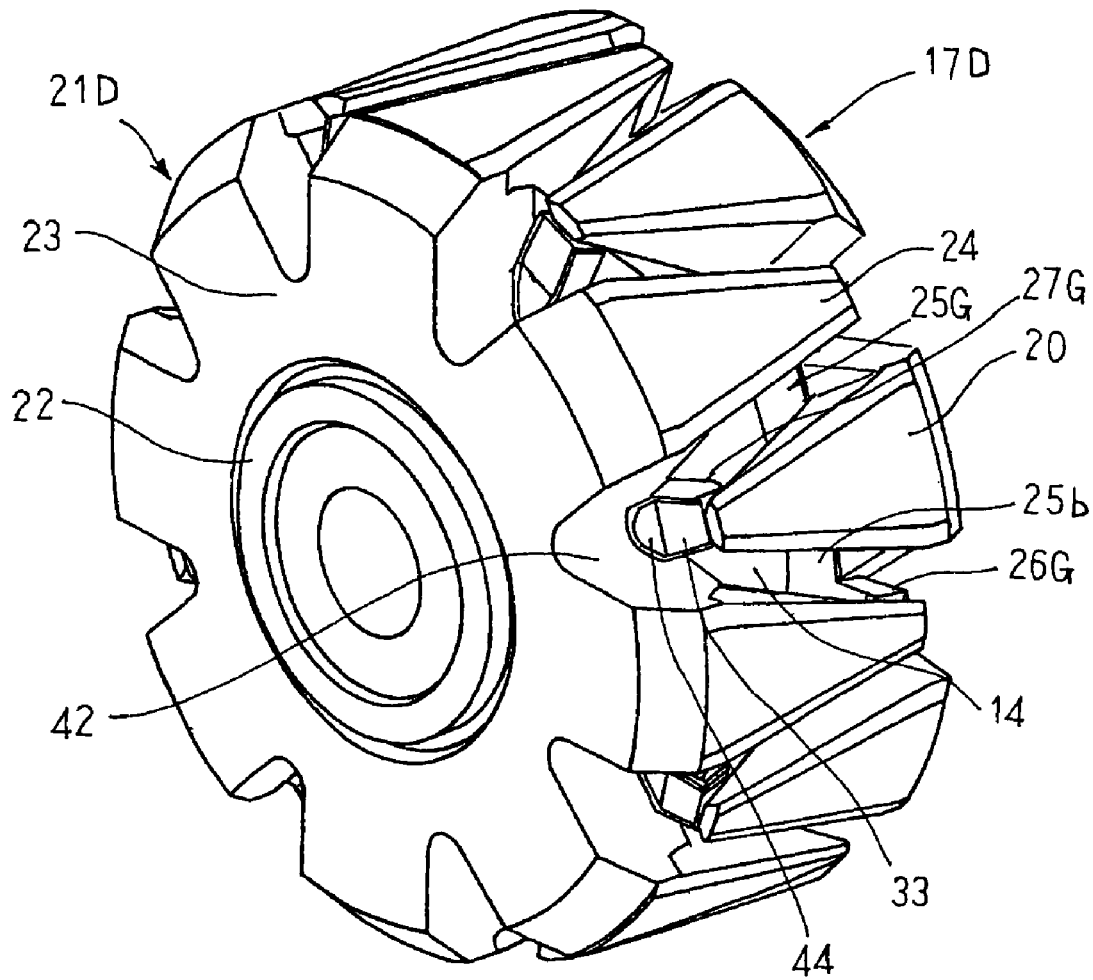
FIG. 18 is a perspective that shows a rotor that can be used in the automotive alternator according to Embodiment 8 of the present invention.
Figure 19:
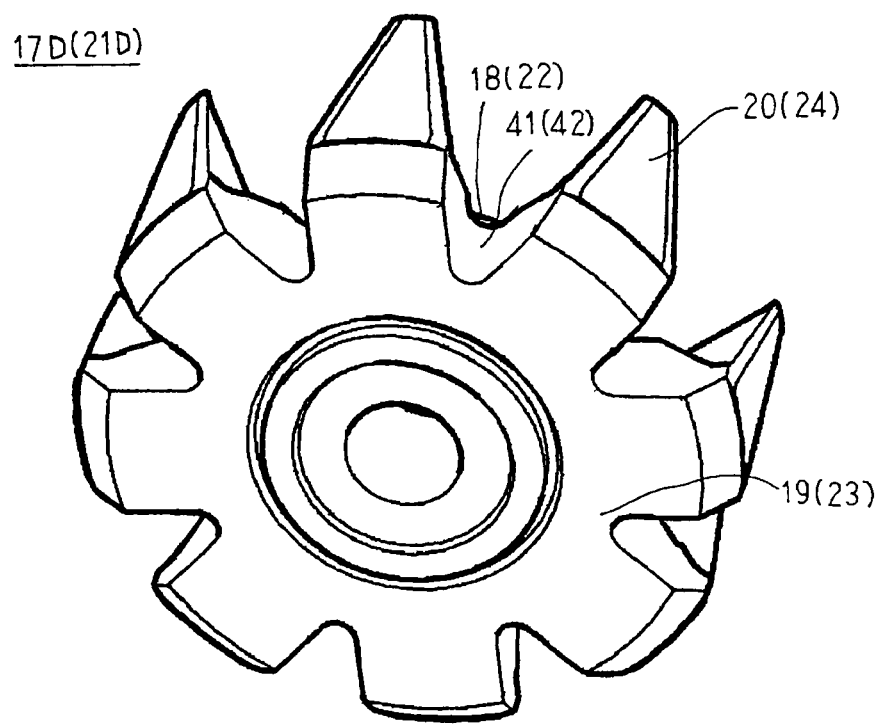
FIG. 19 is a perspective that shows a pole core body that can be used in the automotive alternator according to Embodiment 8 of the present invention.
Figure 20:
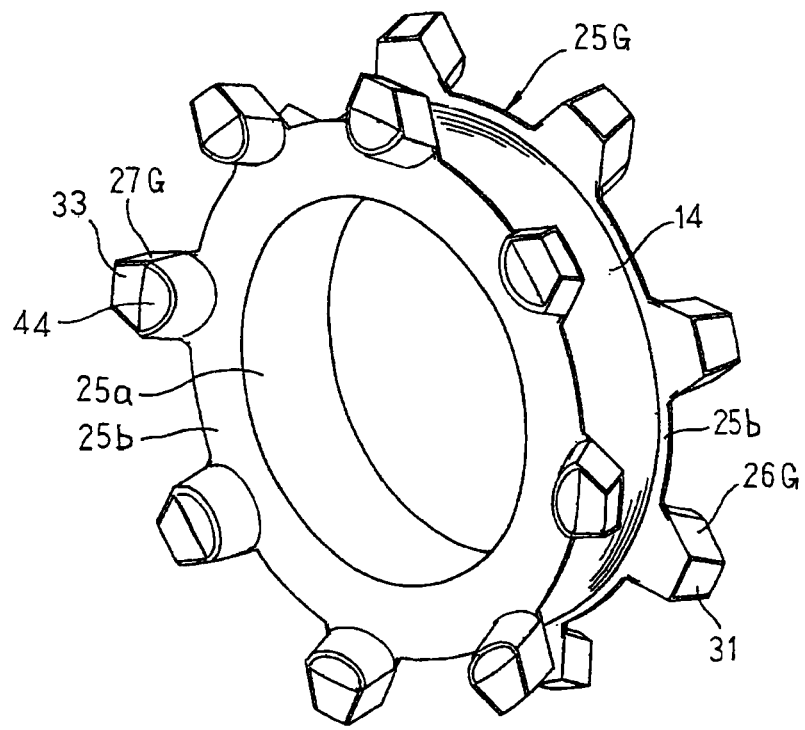
FIG. 20 is a perspective that shows a bobbin into which permanent magnets have been incorporated in the automotive alternator according to Embodiment 8 of the present invention.

FIG. 17 is a cross section that schematically shows an automotive alternator according to Embodiment 8 of the present invention, FIG. 18 is a perspective that shows a rotor that can be used in the automotive alternator according to Embodiment 8 of the present invention, FIG. 19 is a perspective that shows a pole core body that can be used in the automotive alternator according to Embodiment 8 of the present invention, and FIG. 20 is a perspective that shows a bobbin into which permanent magnets have been incorporated in the automotive alternator according to Embodiment 8 of the present invention.

In FIGS. 17 through 20, a pole core 15D is configured so as to be divided into first and second pole core bodies 17D and 21D. First permanent magnets 31 and first magnetic bodies 43 are housed and held in first magnet housing portions 26G of a bobbin 25G, and second permanent magnets 33 and second magnetic bodies 44 are housed and held in second magnet housing portions 27G.

Moreover, the rest of the configuration is configured in a similar manner to Embodiment 1 above.

Modified portions of the automotive alternator according to Embodiment 8 will now be explained in detail.

U-shaped first trough portions 41 that curve concavely radially inward are formed on the first pole core body 17D at portions of a first yoke portion 19 between respective circumferentially adjacent first claw-shaped magnetic pole portions 20. U-shaped second trough portions 42 that curve concavely radially inward are similarly formed on the second pole core body 21D at portions of a second yoke portion 23 between respective circumferentially adjacent second claw-shaped magnetic pole portions 24.

The first and second magnet housing portions 26G and 27G, which are disposed so as to extend axially outward from flange portions 25b of the bobbin 25G, are prepared into horseshoe-shaped tubular bodies in which radially inner sides have curved surface shapes that conform to bottom portion internal surface shapes of the first and second trough portions 41 and 42. Axially inner sides of the first and second magnet housing portions 26G and 27G are closed by the flange portions 25b, and axially outer sides and radially outer sides are open.

The first magnetic bodies 43 are prepared by a cold forging method or drawing, etc., using a magnetic material such as iron, a ferromagnetic alloy, etc., into columnar bodies that have D-shaped cross sections in which side surface are flat surfaces that closely contact bottom surfaces of the first permanent magnets 31, and circumferential surfaces have curved surface shapes that conform to inner circumferential surfaces on the radially inner sides of the first magnet housing portions 26G. Similarly, the second magnetic bodies 44 are prepared by a cold forging method or drawing, etc., using a magnetic material such as iron, a ferromagnetic alloy, etc., into columnar bodies that have D-shaped cross sections in which side surface are flat surfaces that closely contact bottom surfaces of the second permanent magnets 33, and circumferential surfaces have curved surface shapes that conform to inner circumferential surfaces on the radially inner sides of the second magnet housing portions 27G.

Next, a method for assembling of a rotor 13D will be explained.

First, the side surfaces of the first and second magnetic bodies 43 and 44 are fixed to the bottom surfaces of the first and second permanent magnets 31 and 33 using an adhesive, etc. Next, the field coil 14 is wound onto the drum portion 25a of the bobbin 25G, and the integrated first permanent magnets 31 and first magnetic bodies 43 are inserted inside the first magnet housing portions 26G from axially outer openings of the first magnet housing portions 26G. The integrated second permanent magnets 33 and second magnetic bodies 43 are inserted inside the second magnet housing portions 27G from axially outer openings of the second magnet housing portions 27G. At this point, the first and second permanent magnets 31 and 33 and the first and second magnetic bodies 43 and 44 may also be fixed to the first and second magnet housing portions 26G and 27G using an adhesive, etc. Thus, as shown in FIG. 20, a bobbin 25G is obtained to which the field coil 14, the first and second permanent magnets 31 and 33, and the first and second magnetic bodies 43 and 44 have been mounted.

Next, the first boss portion 18 and the second boss portion 22 are pushed into the drum portion 25a from two axial ends, the first and second claw-shaped magnetic pole portions 20 and 24 are alternately intermeshed, and a second end surface of the first boss portion 18 is abutted to a first end surface of the second boss portion 22. Then, the first and second pole core bodies 17D and 21D are fixed to the shaft 16 and integrated by press-fitting the shaft 16 into the shaft insertion apertures of the first and second boss portions 18 and 22 to obtain the rotor 13D.

Here, the bobbin 25G is mounted such that the drum portion 25a is mounted so as to be fitted over the first and second boss portions 18 and 22, and the first and second flange portions 25b lie alongside the inner wall surface of the first and second yoke portions 19 and 23. The first and second magnet housing portions 26G and 27G extend inside the first and second trough portions 41 and 42 such that radially inner sides thereof are placed in close contact with bottom portion inner surfaces of the first and second trough portions 41 and 42, and are fixed to inner surfaces of the first and second trough portions 41 and 42 using an adhesive, etc. The first and second permanent magnets 31 and 33 face inner circumferential surfaces near tip ends of the second and first claw-shaped magnetic pole portions 24 and 20.

Next, flow of magnetic flux that originates from the first and second permanent magnets 31 and 33 will be explained.

First, the magnetic flux that originates from the first permanent magnets 31 passes from the first magnetic bodies 43 through the first yoke portion 19, the first boss portion 18, the second boss portion 22, the second yoke portion 23, and the second claw-shaped magnetic pole portions 24, and returns to the first permanent magnets 31. The magnetic flux that originates from the second permanent magnets 33 enters the first claw-shaped magnetic pole portions 20 by means of the air gap, passes through the first yoke portion 19, the first boss portion 18, the second boss portion 22, the second yoke portion 23, and the second magnetic bodies 44, and returns to the second permanent magnets 33. Thus, the magnetic flux that originates from the first and second permanent magnets 31 and 33 is in a reverse direction from the magnetic flux that originates from the field coil 14, enabling the magnetic flux density of the magnetic bodies that constitute the first and second pole core bodies 17D and 21D to be reduced significantly, thereby enabling magnetic saturation to be relieved.

Consequently, according to Embodiment 8, similar effects to those in Embodiment 1 above can be achieved.

In a Lundell pole core, a core body that has a shape in which portions that correspond to claw-shaped magnetic pole portions extend radially outward from a yoke portion is molded using a cold forging method, and then claw-shaped magnetic pole portions are formed by bending approximately at right angles the portions that correspond to claw-shaped magnetic pole portions that extend radially outward from the yoke portion. In the first and second pole core bodies 17D and 21D according to Embodiment 8, first and second trough portions 41 and 42 are formed on first and second yoke portions 19 and 23. Thus, if the first and second trough portions 41 and 42 are formed on the first and second yoke portions 19 and 23 during molding of the core body, the portions that correspond to claw-shaped magnetic pole portions can be bent easily, enabling yield to be increased in the step of bending the portions that correspond to claw-shaped magnetic pole portions.

It is difficult to increase dimensional precision of the first and second trough portions 41 and 42 if the first and second trough portions 41 and 42 are formed using a cold forging method. However, because the first and second permanent magnets 31 and 33 and the first and second magnetic bodies 43 and 44 are housed and held in the first and second magnet housing portions 26G and 27G and fitted together with the first and second trough portions 41 and 42, poor dimensional precision in the first and second trough portions 41 and 42 can be absorbed by deformation of the resin first and second magnet housing portions 26G and 27G. Thus, it is not necessary to increase the dimensional precision of the first and second pole core bodies 17D and 21D inordinately, enabling manufacturing costs to be reduced.

Because the first and second permanent magnets 31 and 33 are disposed in the first and second trough portions 41 and 42 together with the first and second magnetic bodies 43 and 44, the volume of expensive first and second permanent magnets 31 and 33 can kept to a required minimum, enabling costs to be reduced.

Embodiment 9

In Embodiment 8 above, permanent magnets (the first and second permanent magnets 31 and 33) and magnetic bodies (the first and second magnetic bodies 43 and 44) were prepared as separate parts, but in Embodiment 9, permanent magnets and magnetic bodies are molded together by double molding (dichromatic molding) and prepared as a single part.

Consequently, according to Embodiment 9, similar effects to those in the Embodiment 8 above can be achieved, and the number of parts is also reduced, eliminating need for steps to fix and integrate the permanent magnets and the magnetic bodies using an adhesive, etc., and enabling a rotor assembly process to be shortened.

Embodiment 10

Figure 21:
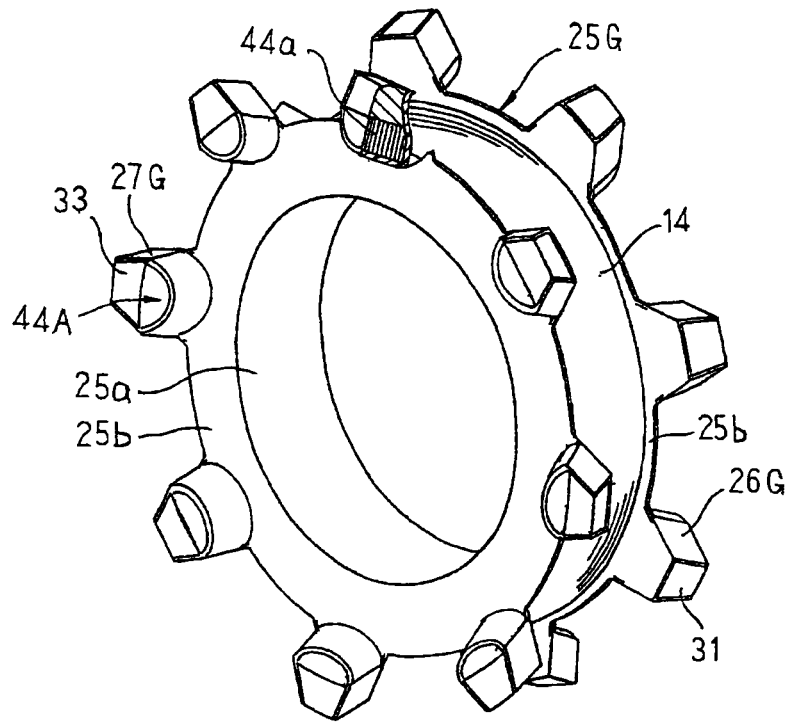
FIG. 21 is a partially cut away perspective that shows a bobbin into which permanent magnets have been incorporated in an automotive alternator according to Embodiment 10 of the present invention.

In Embodiment 8 above, the first and second magnetic bodies 43 and 44 are prepared using solid bodies of magnetic material, but in Embodiment 10, second magnetic bodies 44A are prepared using laminated bodies in which thin plates 44a of magnetic material are laminated and integrated, as shown in FIG. 21. Moreover, although not shown, first magnetic bodies are also prepared using laminated bodies of thin plates of magnetic material.

Consequently, according to Embodiment 10, effects can be achieved in a similar manner to Embodiment 8 above.

According to Embodiment 10, because the first and second magnetic bodies are prepared using laminated bodies of thin plates 44a of magnetic material, the thin plates 44a that are stacked can be prepared easily by press forming, facilitating manufacture of the first and second magnetic bodies. Because the first and second magnetic bodies are prepared by axially laminating thin plates 44a that have been punched into semicircular planar shapes, only one mold is required to press the thin plates 44a, enabling costs to be reduced.

Embodiment 11

Figure 22:
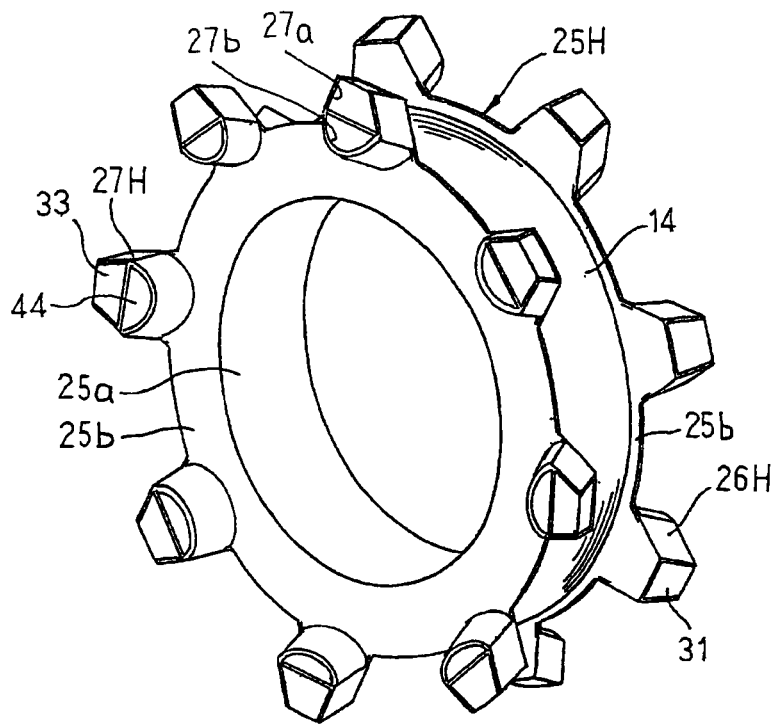
FIG. 22 is a perspective that shows a bobbin into which permanent magnets have been incorporated in an automotive alternator according to Embodiment 11 of the present invention.

FIG. 22 is a perspective that shows a bobbin into which permanent magnets have been incorporated in an automotive alternator according to Embodiment 11 of the present invention.

In FIG. 22, second magnet housing portions 27H that are disposed so as to extend axially outward from one flange portion 25b of a bobbin 25H are partitioned into permanent magnet housing portions 27a on a radially outer side and magnetic body housing portions 27b on a radially inner side. Second permanent magnets 33 are housed and held inside the permanent magnet housing portions 27a, and second magnetic bodies 44 are housed and held inside the magnetic body housing portions 27b. Moreover, although not shown, first magnet housing portions 26H that are disposed so as to extend axially outward from another flange portion 25b of the bobbin 25H are also partitioned into permanent magnet housing portions on a radially outer side and magnetic body housing portions on a radially inner side. First permanent magnets 31 are housed and held inside the permanent magnet housing portions, and first magnetic bodies 43 are housed and held inside the magnetic body housing portions.

Moreover, the rest of the configuration is configured in a similar manner to Embodiment 8 above.

Consequently, according to Embodiment 11, similar effects to those in Embodiment 8 above can be achieved.

According to Embodiment 11, because the first and second permanent magnets 31 and 33 and the first and second magnetic bodies 43 and 44 are housed separately in the permanent magnet housing portions and the magnetic body housing portions, poor dimensional precision in the first and second permanent magnets 31 and 33 and the first and second magnetic bodies 43 and 44 can be absorbed by deformation of the resin first and second magnet housing portions 26H and 27H. Thus, it is not necessary to increase the dimensional precision of the first and second permanent magnets 31 and 33 and the first and second magnetic bodies 43 and 44 inordinately, enabling manufacturing costs to be reduced.

Embodiment 12

Figure 23:
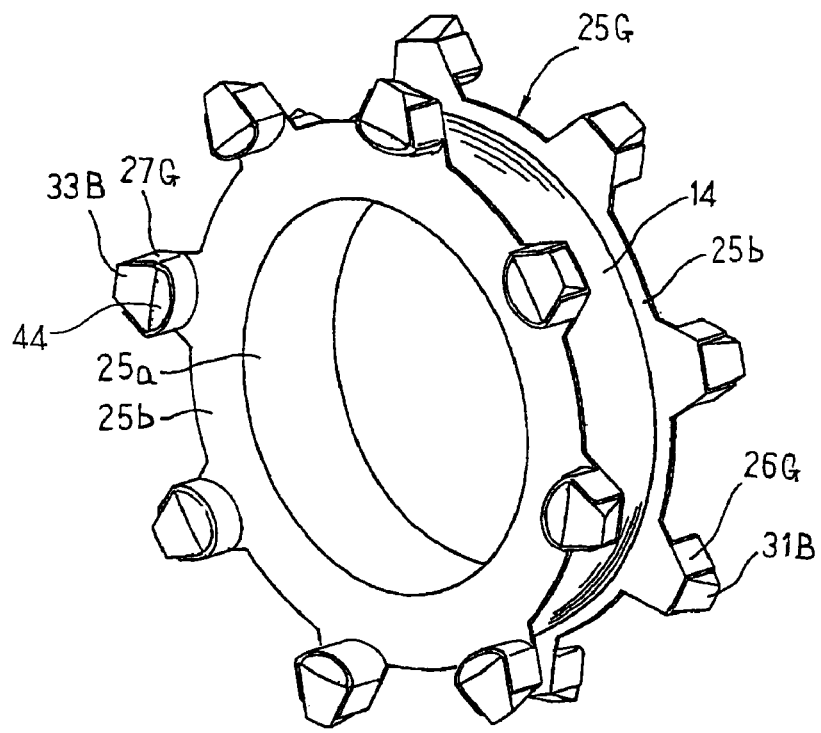
FIG. 23 is a perspective that shows a bobbin into which permanent magnets have been incorporated in an automotive alternator according to Embodiment 12 of the present invention.

In Embodiment 8 above, first and second permanent magnets 31 and 33 are used, but in Embodiment 12, first and second permanent magnets 31B and 33B are used, as shown in FIG. 23.

Consequently, in Embodiment 12, similar effects to those in Embodiment 8 above can also be achieved.

Embodiment 13

Figure 24:
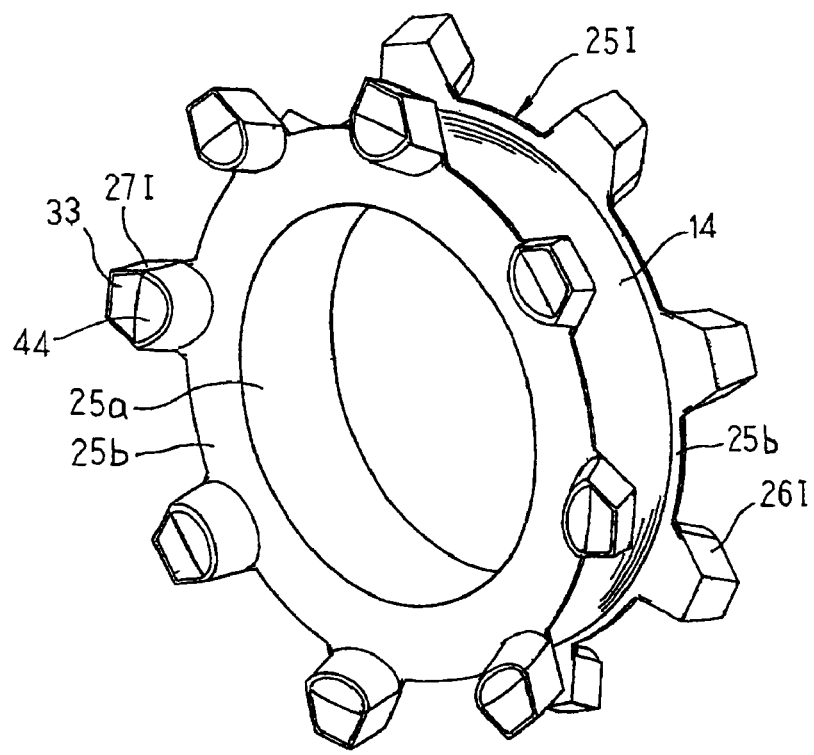
FIG. 24 is a perspective that shows a bobbin into which permanent magnets have been incorporated in an automotive alternator according to Embodiment 13 of the present invention.

FIG. 24 is a perspective that shows a bobbin into which permanent magnets have been incorporated in an automotive alternator according to Embodiment 13 of the present invention.

In FIG. 24, only axially outer sides of second magnet housing portions 27I that are disposed so as to extend axially outward from one flange portion 25b of a bobbin 25I are open. Second permanent magnets 33 and second magnetic bodies 44 are housed and held in the second magnet housing portions 27I. Although not shown, only axially outer sides of first magnet housing portions 26I that are disposed so as to extend axially outward from another flange portion 25b of the bobbin 25I are also open. First permanent magnets 31 and first magnetic bodies 43 are housed and held in the first magnet housing portions 26I.

Moreover, the rest of the configuration is configured in a similar manner to Embodiment 8 above.

Consequently, according to Embodiment 13, similar effects to those in Embodiment 8 above can be achieved.

According to Embodiment 13, upper surfaces of the first and second permanent magnets 31 and 33 are covered by the resin first and second magnet housing portions 26I and 27I. Thus, even if portions near the tip ends of the first and second claw-shaped magnetic pole portions 20 and 24 pivot due to centrifugal forces, etc., and hit the first and second permanent magnets 31 and 33, the first and second magnet housing portions 26I and 27I constitute buffer layers, suppressing occurrences of damage to the first and second permanent magnets 31 and 33. Even if the first and second permanent magnets 31 and 33 were hypothetically damaged, scattering of fragments of the first and second permanent magnets 31 and 33 would be suppressed.

Moreover, in Embodiments 8 through 13 above, axially outer sides of the magnet housing portions are open and axially inner sides are closed, but axially inner sides of the magnet housing portions may also be open and axially outer sides closed. In that case, permanent magnets and magnetic bodies are housed in the magnet housing portions from axially inside, and axially outward dislodgment of the permanent magnets and the magnetic bodies is suppressed.

In Embodiments 8 through 13 above, the permanent magnets and the magnetic bodies are inserted into the magnet housing portions from axially outside, but permanent magnets and magnetic bodies may also be insert-molded into magnet housing portions during molding of a bobbin.

In each of the above embodiments, permanent magnets are disposed on all portions of the yoke portions that are positioned between circumferentially adjacent claw-shaped magnetic pole portions, but it is not necessary for the permanent magnets to be disposed on all portions of the yoke portions that are positioned between the circumferentially adjacent claw-shaped magnetic pole portions, and they may also be disposed on selected portions of the yoke portions that are positioned between the circumferentially adjacent claw-shaped magnetic pole portions. In that case, it is preferable that consideration be given to magnetic balance and mechanical balance when disposing the permanent magnets. For example, permanent magnets may also be disposed on all portions of the yoke portion that are positioned between the circumferentially adjacent claw-shaped magnetic pole portions of the second pole core body without disposing permanent magnets on the first pole core body. They may also be disposed on every second portion of the yoke portions that are positioned between the circumferentially adjacent claw-shaped magnetic pole portions in the respective first and second pole core bodies. By adopting this configuration, output from the automotive alternator can be adjusted, enabling cost reductions that accompany a reduction in the number of permanent magnets.

In each of the above embodiments, the first and second permanent magnets are magnetically oriented so as to be opposite to the orientation of the magnetic field that the field current that flows through the field coil produces in a plane that is perpendicular to the central axis of the rotor. Thus, the directions of magnetization of the first and second permanent magnets are aligned perfectly radially. However, it is not necessary for the directions of magnetization of the first and second permanent magnets to be aligned perfectly radially, and for example, the directions of magnetization of the first and second permanent magnets may also be oriented magnetically so as to be perpendicular to inner circumferential surfaces near tip ends of facing second and first claw-shaped magnetic pole portions. In that case, the directions of magnetization of the first and second permanent magnets will be closer to being parallel to the direction of the magnetic flux, and magnetic pole area of the first and second permanent magnets near the inner circumferential surfaces of the second and first claw-shaped magnetic pole portions can also be used maximally, enabling the amount of magnetic flux to be increased.

In each of the above embodiments, explanations are given for automotive alternators, but the present invention is not limited to automotive alternators, and similar effects are also exhibited if applied to dynamoelectric machines such as automotive electric motors, automotive generator-motors, etc.

What is claimed is:

1. A dynamoelectric machine comprising:
    a rotor comprising:
        a pole core comprising:
            a boss portion;
            a pair of yoke portions that are disposed so as to extend radially outward from two axial end edge portions of said boss portion; and
            a plurality of claw-shaped magnetic pole portions that are disposed so as to extend in an axial direction alternately from each of said pair of yoke portions, and that are arranged circumferentially so as to intermesh with each other,
        said pole core being fixed to a shaft that is inserted through a central axial position of said boss portion;
    a resin bobbin comprising:
        a drum portion that is mounted so as to be fitted over said boss portion; and
        a pair of flange portions that extend radially outward from two axial end portions of said drum portion along inner wall surfaces of said pair of yoke portions; and
    a field coil that is wound onto said bobbin, and that is housed inside a space that is surrounded by said boss portion, said pair of yoke portions, and said plurality of claw-shaped magnetic pole portions; and
    a stator that is disposed so as to surround said rotor with a predetermined air gap interposed,
wherein:
    a magnet housing portion is disposed integrally on an outer circumferential portion of at least one flange portion of said pair of flange portions of said bobbin so as to extend axially outward and so as to extend near a portion of said yoke portions that faces an inner circumferential surface near a tip end of said claw-shaped magnetic pole portions;
    a permanent magnet is housed and held in said magnet housing portion, is disposed so as to face said inner circumferential surface near said tip end of said claw-shaped magnetic pole portions, and is magnetically oriented in a reverse direction to a direction of a magnetic field that said field coil produces;
    trough portions are formed so as to curve concavely radially inward at portions of said yoke portions between respective circumferentially adjacent claw-shaped magnetic pole portions;
    a magnetic body is housed and held inside said magnet housing portion together with said permanent magnet so as to be positioned radially inside said permanent magnet; and
    said magnet housing portion is held by said yoke portions by fitting together with said trough portions.

2. The dynamoelectric machine according to claim 1, wherein said permanent magnet and said magnetic body that are housed and held in said magnet housing portion are molded by dichromatic molding.

3. The dynamoelectric machine according to claim 1, wherein:
    a permanent magnet housing portion and a magnetic body housing portion are partitioned so as to line up radially inside said magnet housing portion; and
    said permanent magnet is housed and held in said permanent magnet housing portion, and said magnetic body is housed and held in said magnetic body housing portion.

4. The dynamoelectric machine according to claim 1, wherein said magnetic body is prepared using a solid body.

5. The dynamoelectric machine according to claim 1, wherein said magnetic body is prepared using a laminated body of magnetic plates.

6. A dynamoelectric machine comprising:
    a rotor comprising:
        a pole core comprising:
            a boss portion;
            a pair of yoke portions that are disposed so as to extend radially outward from two axial end edge portions of said boss portion; and a plurality of claw-shaped magnetic pole portions that are disposed so as to extend in an axial direction alternately from each of said pair of yoke portions, and that are arranged circumferentially so as to intermesh with each other, said pole core being fixed to a shaft that is inserted through a central axial position of said boss portion;

a resin bobbin comprising:
  a drum portion that is mounted so as to be fitted over said boss portion; and
  a pair of flange portions that extend radially outward from two axial end portions of said drum portion along inner wall surfaces of said pair of yoke portions; and a field coil that is wound onto said bobbin, and that is housed inside a space that is surrounded by said boss portion, said pair of yoke portions, and said plurality of claw-shaped magnetic pole portions; and a stator that is disposed so as to surround said rotor with a predetermined air gap interposed, wherein:

a magnet housing portion is disposed integrally on an outer circumferential portion of at least one flange portion of said pair of flange portions of said bobbin so as to extend axially outward and so as to extend near a portion of said yoke portions that faces an inner circumferential surface near a tip end of said claw-shaped magnetic pole portions;

a permanent magnet is housed and held in said magnet housing portion, is disposed so as to face said inner circumferential surface near said tip end of said claw-shaped magnetic pole portions, and is magnetically oriented in a reverse direction to a direction of a magnetic field that said field coil produces;

a magnet seat portion is disposed so as to project from said portion of said yoke portion that faces said inner circumferential surface near said tip end of said claw-shaped magnetic pole portions;

an interfitting recess portion is disposed on a portion of said magnet seat portion that faces said claw-shaped magnetic pole portions so as to extend axially;

said magnet housing portion in which said permanent magnet is housed and held is fitted into and held by said interfitting recess portion, said magnet housing portion being held by said magnet seat portion; and said permanent magnet is insert-molded into said magnet housing portion such that at least a surface that faces said magnet seat portion and two axial end surfaces are embedded.

7. The dynamoelectric machine according to claim 6, wherein said permanent magnet is prepared into a columnar body in which a cross section that is perpendicular to a central axis of said shaft is approximately quadrilateral.

8. The dynamoelectric machine according to claim 6, wherein said permanent magnet is prepared into a columnar body in which a cross section that is perpendicular to a central axis of said shaft is circular.

9. A dynamoelectric machine comprising:

a rotor comprising:

a pole core comprising:
  a boss portion;
  a pair of yoke portions that are disposed so as to extend radially outward from two axial end edge portions of said boss portion; and
  a plurality of claw-shaped magnetic pole portions that are disposed so as to extend in an axial direction alternately from each of said pair of yoke portions, and that are arranged circumferentially so as to intermesh with each other, said pole core being fixed to a shaft that is inserted through a central axial position of said boss portion;

a resin bobbin comprising:
  a drum portion that is mounted so as to be fitted over said boss portion; and
  a pair of flange portions that extend radially outward from two axial end portions of said drum portion along inner wall surfaces of said pair of yoke portions; and a field coil that is wound onto said bobbin, and that is housed inside a space that is surrounded by said boss portion, said pair of yoke portions, and said plurality of claw-shaped magnetic pole portions; and a stator that is disposed so as to surround said rotor with a predetermined air gap interposed, wherein:

a magnet housing portion is disposed integrally on an outer circumferential portion of at least one flange portion of said pair of flange portions of said bobbin so as to extend axially outward and so as to extend near a portion of said yoke portions that faces an inner circumferential surface near a tip end of said claw-shaped magnetic pole portions;

a permanent magnet is housed and held in said magnet housing portion, is disposed so as to face said inner circumferential surface near said tip end of said claw-shaped magnetic pole portions, and is magnetically oriented in a reverse direction to a direction of a magnetic field that said field coil produces;

a magnet seat portion is disposed so as to project from said portion of said yoke portion that faces said inner circumferential surface near said tip end of said claw-shaped magnetic pole portions;

an upper surface of said magnet seat portion is formed into a flat surface that is tangential to a cylindrical surface that has a central axis of said shaft as a central axis;

said magnet housing portion in which said permanent magnet is housed and held is held by said magnet seat portion by being fixed adhesively to said upper surface of said magnet seat portion; and said permanent magnet is insert-molded into said magnet housing portion such that at least a surface that faces said magnet seat portion and two axial end surfaces are embedded.

10. The dynamoelectric machine according to claim 9, wherein said permanent magnet is prepared into a columnar body in which a cross section that is perpendicular to a central axis of said shaft is approximately quadrilateral.

* * * * *